(12) United States Patent
Nagai

(10) Patent No.: US 7,768,900 B2
(45) Date of Patent: Aug. 3, 2010

(54) INFORMATION STORAGE MEDIUM, INFORMATION RECORDING METHOD, AND INFORMATION REPRODUCING METHOD

(75) Inventor: Koichi Nagai, Chigasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 147 days.

(21) Appl. No.: 12/020,220

(22) Filed: Jan. 25, 2008

(65) Prior Publication Data
US 2008/0198733 A1 Aug. 21, 2008

(30) Foreign Application Priority Data
Jan. 30, 2007 (JP) ............... 2007-020020

(51) Int. Cl.
G11B 7/24 (2006.01)
(52) U.S. Cl. .................................. 369/275.3
(58) Field of Classification Search ... 369/275.1–275.5, 369/47.11, 47.22
See application file for complete search history.

(56) References Cited

U.S. PATENT DOCUMENTS
6,411,574 B1 * 6/2002 Su et al. ................. 369/47.11

2005/0105421 A1 5/2005 Nijboer et al.
2005/0154682 A1 7/2005 Taylor

FOREIGN PATENT DOCUMENTS

| CN | 1619659 A | 5/2005 |
|---|---|---|
| EP | 1 533 807 A2 | 5/2005 |
| JP | 10-275364 | 10/1998 |
| JP | 2000-222780 | 8/2000 |
| JP | 2001-266362 | 9/2001 |
| JP | 2001-325727 | 11/2001 |
| JP | 2002-150564 | 5/2002 |
| JP | 2004-206825 | 7/2004 |
| KR | 10-2005-0048515 | 5/2005 |
| WO | WO 2008/030002 A1 | 3/2008 |

* cited by examiner

Primary Examiner—Ali Neyzari
(74) Attorney, Agent, or Firm—Oblon, Spivak, McClelland, Maier & Neustadt, L.L.P.

(57) ABSTRACT

According to one embodiment, an information storage medium comprising a lead-in area, and a data area, wherein the lead-in area includes a control data zone storing physical format information which includes first information common to book types, second information peculiar to a book type, and third information peculiar to each kind of second information. The first information includes byte information indicating the book type and a version number, and the second information includes byte information indicating the major digit of a revision number and a disc indicator.

3 Claims, 12 Drawing Sheets

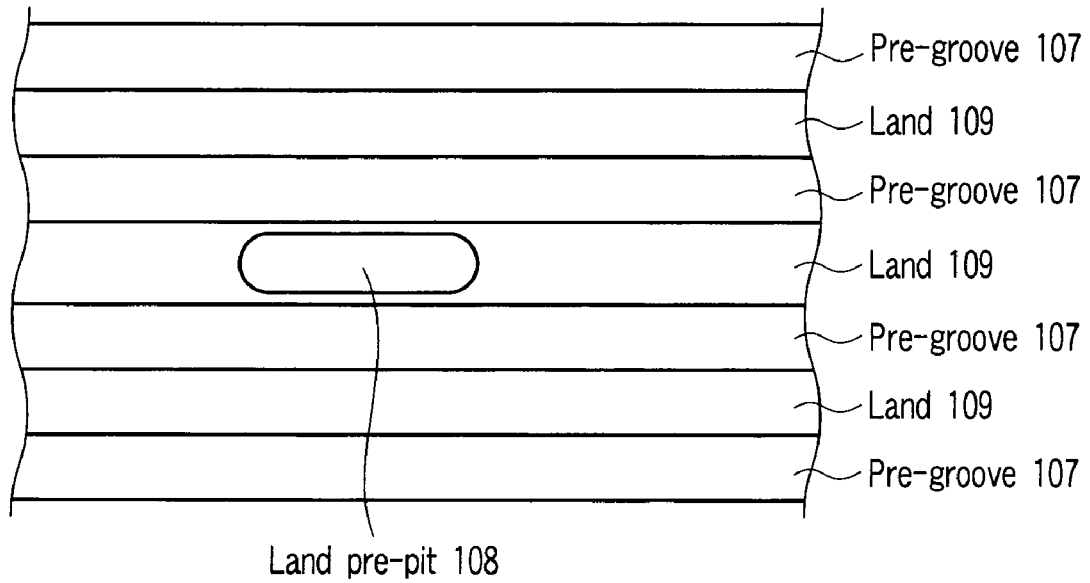
F I G. 10A
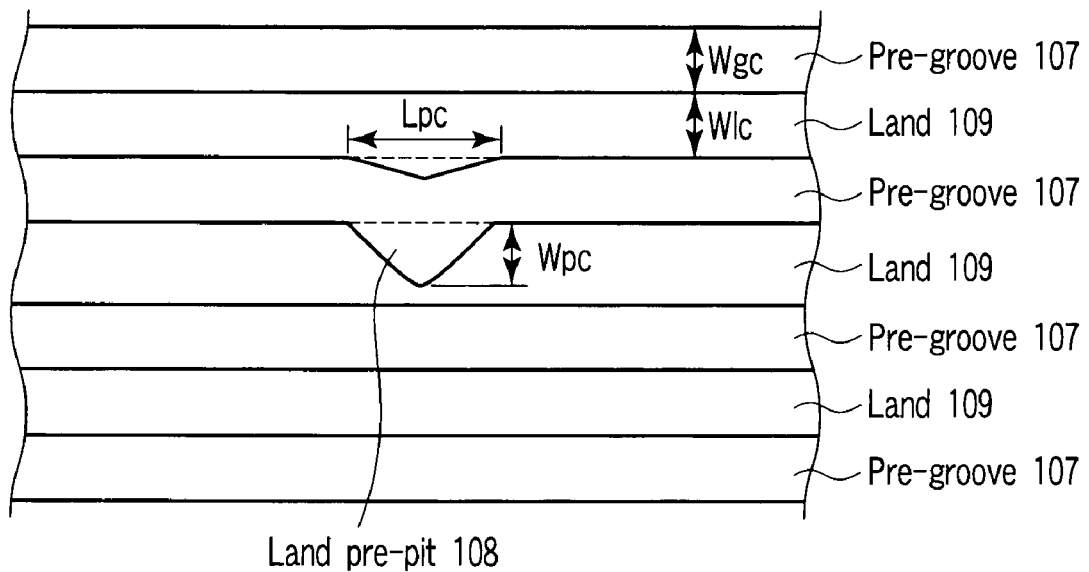
F I G. 10B

FIG. 12A

| Lead-in area LDI | | | | | Data area DTA |
|---|---|---|---|---|---|
| Initial zone INZ | Reference code recording zone RCZ | Buffer zone 1 BFZ1 | Control data zone CDZ | Buffer zone 2 BFZ2 | |

FIG. 12B

| Control data zone CDZ | |
|---|---|
| Physical format information PFI | Disk-related information DMI |

| Physical format information PFI | | |
|---|---|---|
| Information area peculiar to each book | | |
| Common information 261 in DVD family | Area peculiar to each book *Disc identifier 262 for medium of present invention (byte position is 511) | Information area peculiar to each byte position 511 *Information 263 peculiar to type and version of each book *Write strategy information 264 |

| Disc-related information DMI | | |
|---|---|---|
| | Disc manufacturer information 252 | Others 253 |

FIG. 12C

| Information name | Common information 261 in DVD family | Area peculiar to each book *Disc identifier 262 for medium of present invention (byte position is 511) | Information area peculiar to each byte position 511 *Information 263 peculiar to type and version of each book *Write strategy information 264 |
|---|---|---|---|
| Kind of recorded information | | | |
| Byte position | 0 to 31 | 32 to 511 | 512 to 2047 |

FIG. 12D

| Byte position | 0 to 16 | 17 to 31 |
|---|---|---|
| Kind of recorded information | Information 267 common to all of read-only type, rewritable/re-recordable type and recordable type | Common information 268 recorded in rewritable/re-recordable type and recordable type (not recorded in read-only type, and rewritable/re-recordable and recordable disc of present embodiment) |

| Kind of recorded information | Byte position | Physical format information PFI | | | R physical format information |
|---|---|---|---|---|---|
| | | Read-only type, and rewritable/re-recordable and recordable type of present embodiment | Conventional rewritable/re-recordable type | Conventional recordable type | |
| Information 267 common to all of read-only type, rewritable/re-recordable type and recordable type | 0 | Book type and part version | | | |
| | 1 | Disc size and maximum transfer rate of the disc | | | |
| | 2 | Disc structure | | | |
| | 3 | Recording density | | | |
| | 4 to 15 | Data area allocation | | | |
| | 16 | BCA descriptor | | | |
| Common information 268 in DVD family and in rewritable/re-recordable type and recordable type | 17 | Reserved | | Revision number of maximum recording speed | |
| | 18 | | | Revision number of minimum recording speed | |
| | 19 to 25 | | | Revision number table | |
| | 26 | | | Class | |
| | 27 | | | Extended part version | |
| | 28 to 31 | | | Reserved | |
| Peculiar information for each type of each book | 32 to 510 | Reserved | | Peculiar information for each book  Physical parameters required for recording (value of write strategy) or information peculiar to disc | |
| | 511 | Page descriptor PGD which is disc identifier 262 (higher 4 bits of disc identifier 262 correspond to disc indicator, lower 4 bits correspond to major digits of revision number) | | | |
| Information area peculiar to each value of byte position 511 | 512 to 558 | Disc manufacturer name information | | | |
| | 559 to 574 | Additional information from disc manufacturer | | | |
| | 575 | Polarity (identification of whether H→L or L→H) of recording mark | | | |
| | 576 | Linear velocity in recording or reproduction | | | |
| | 577 | Rim intensity value of optical system along circumferential direction | | | |
| | 578 | Rim intensity value of optical system along radial direction | | | |
| | 579 | Recommended laser power (value of light amount on recording surface) in reproduction | | | |
| | 580 to 600 | Reserved | | | |
| | 601 | Peak power | | | |
| | 602 | Bias power 1 | | | |
| | 603 | Bias power 2 | | | |
| | 604 | Bias power 3 | | | |
| | 605 | Peak power | | | |
| | 606 | Bias power 1 | | | |
| | 607 | Bias power 2 | | | |
| | 608 | Bias power 3 | | | |
| | 609 to | ......... | | | |
| | xxx to yyy | Reserved | | | |
| | zzz to 2047 | Reserved | | | |

FIG. 13

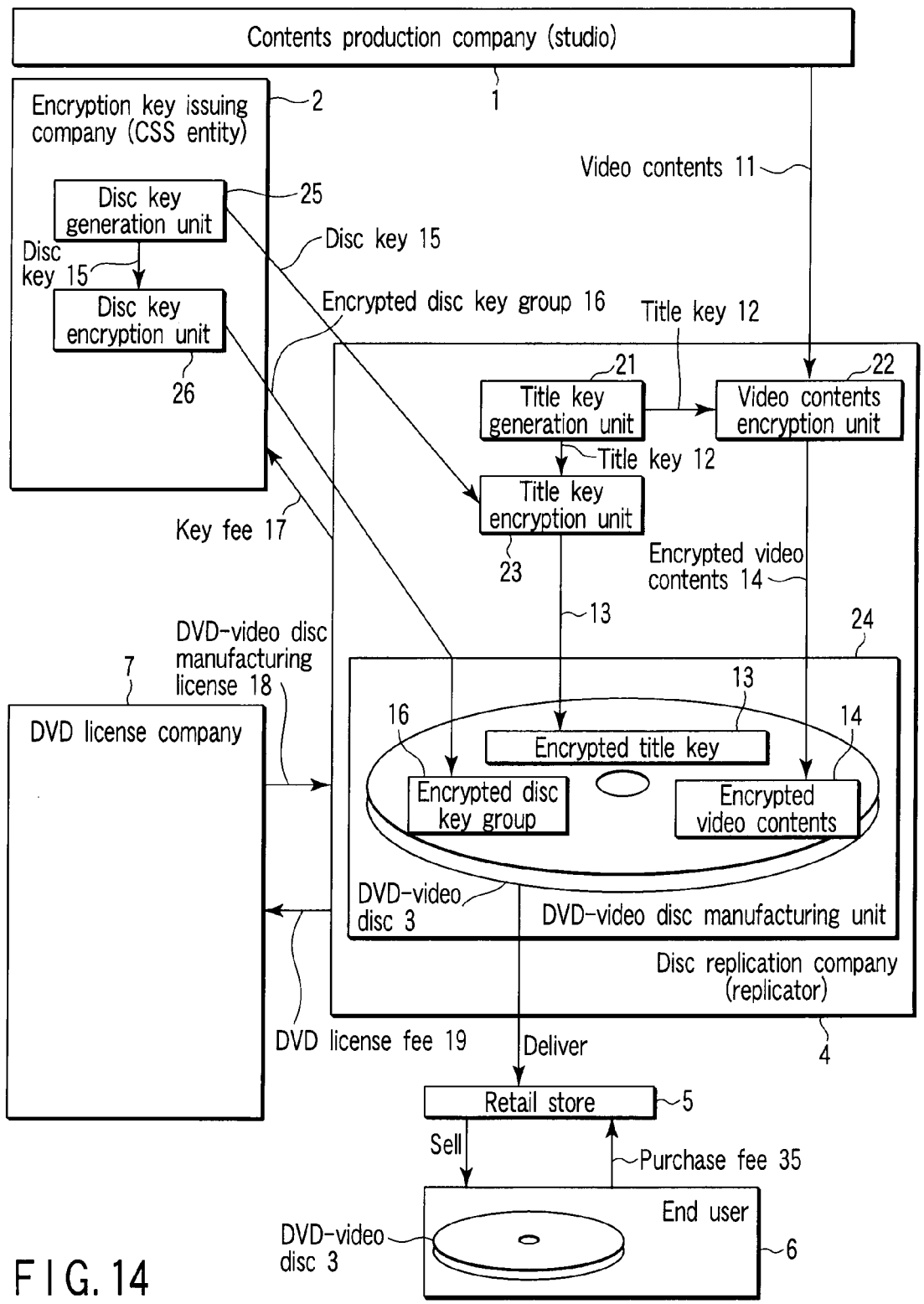
F I G. 14

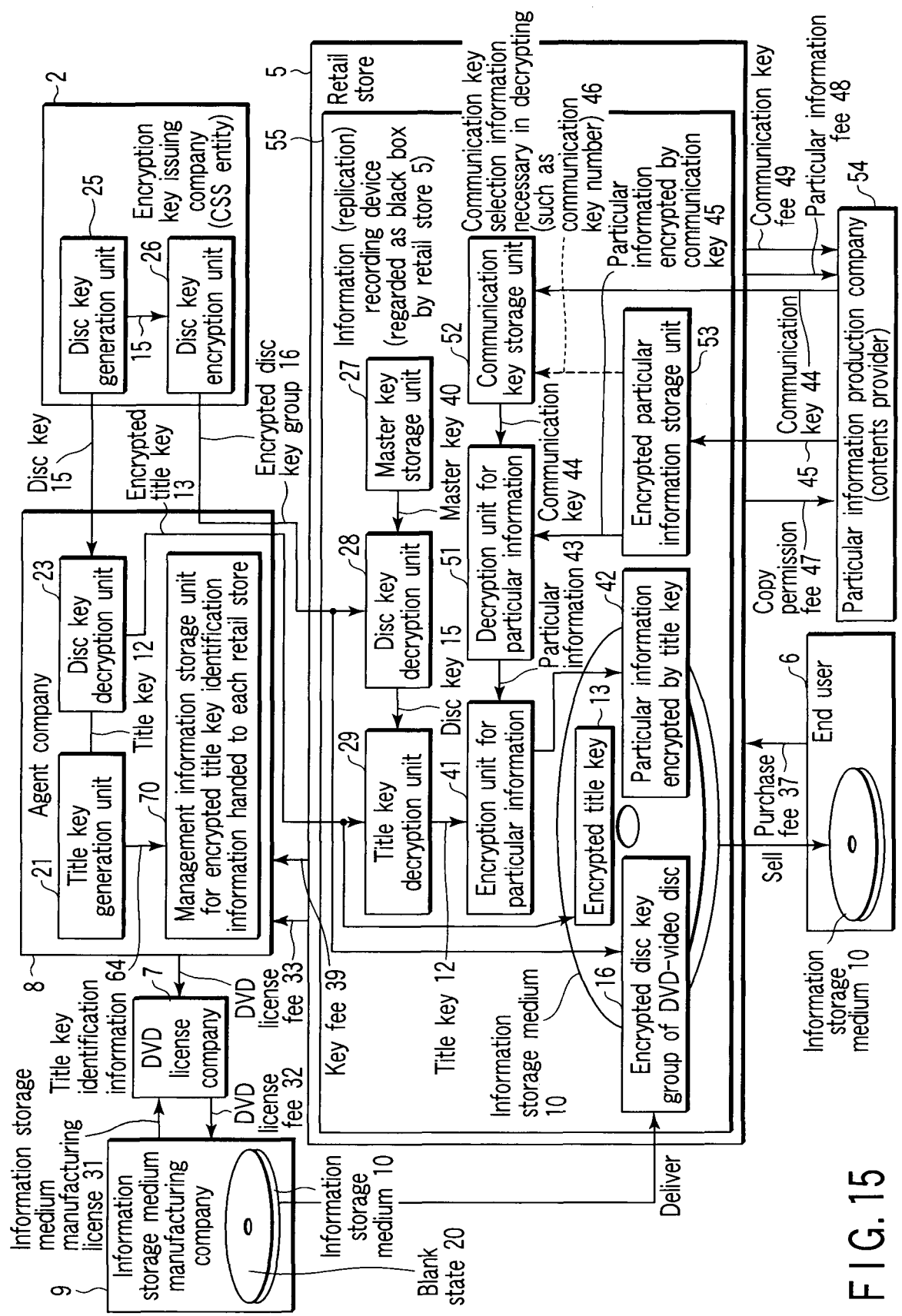
F I G. 15

INFORMATION STORAGE MEDIUM, INFORMATION RECORDING METHOD, AND INFORMATION REPRODUCING METHOD

CROSS-REFERENCE TO RELATED APPLICATIONS

This application is based upon and claims the benefit of priority from Japanese Patent Application No. 2007-020020, filed Jan. 30, 2007, the entire contents of which are incorporated herein by reference.

BACKGROUND

1. Field

One embodiment of the invention relates to an information storage medium, an information recording method, and an information reproducing method.

2. Description of the Related Art

It has been a long time since information recording media capable of recording and reproducing information using laser light, that is to say, optical discs were put to practical use. For example, several hours of images of a normal quality can be recorded on an optical disc of a DVD (digital versatile disc) standard which is 12 cm in diameter. In a read-only optical disc, images and contents can be recorded in a short time by pressing or molding. In addition, a land pre-pit and a groove track (pre-groove) are formed in a type of optical disc which permits recording (write-once) or erasing (re-recordable) of information.

Jpn. Pat. Appln. KOKAI Publication No. 2001-266362 has shown that, when a new recording mark is to be recorded in an information storage medium having a pre-groove and a land pre-pit, (a) a large detection signal is obtained from the land pre-pit to ensure the reliability in reproduction from address information recorded in the land pre-pit, and (b) a large off-track detection signal is obtained from the pre-groove to ensure high tracking stability during the formation of the recording mark.

Hitherto, in the optical discs of the DVD standard, the identification of a disc has been carried out using a book type recorded in higher four bits of a byte position BP0 of a physical format information zone in a lead-in area. The book type indicates a predetermined code allocated to each standard document of the DVD forum. A part version is recorded in lower four bits of the byte position BP0. The part version indicates not the digit of a version number itself but a predetermined code allocated to each version of a standard document of the DVD forum. For example, 0000b is allocated to a version 0.9 (for testing), 0001b is allocated to a version 1.0x, 0100b is allocated to a version 1.9 (for testing), 0101b is allocated to a version 2.0x, and 0110b is allocated to a version 2.1x, and the rest are reserved.

In recent years, studies have been carried out on a new standard for recording encrypted contents on a disc. There has been a desire that a recordable disc (write-once, re-recordable or rewritable disc) in which encrypted contents are recorded in accordance with this standard be played back not by a device which has recorded the encrypted contents but by other players. Thus, it is necessary for the player to recognize the recorded disc as a read-only DVD-ROM even if the disc is a recordable disc. The reason is that, originally, there has been a rule which forbids encrypted contents to be reproduced when the encrypted contents are recorded on the recording medium in view of security, so that there are a large number of devices designed to be unable to reproduce the encrypted contents if the book type is not the DVD-ROM.

However, as there are increasing needs for downloading encrypted contents, recording the contents on a disc and then reproducing the contents from the disc due to the recent development of networks, the book type has to be the DVD-ROM.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIGS. 10A and 10B are exemplary schematic diagrams explaining the structure of a land pre-pit in the recordable information storage medium in FIGS. 1 and 2;

FIGS. 12A, 12B, 12C, and 12D are exemplary schematic diagrams explaining the data structure of the recording area in the recordable information storage medium in FIG. 2;

FIG. 13 is an exemplary schematic diagram explaining physical format information and R physical format information for the data structure shown in FIGS. 12A to 12D;

FIG. 14 is an exemplary schematic diagram explaining a current video information distribution system;

FIG. 15 is an exemplary schematic diagram explaining one example of a video information distribution system realized by using the information storage medium of the present embodiment.

DETAILED DESCRIPTION

Various embodiments according to the invention will be described hereinafter with reference to the accompanying drawings. In general, according to one embodiment of the invention, an information storage medium which comprises a lead-in area, and a data area located in an outer side of the lead-in area, wherein the lead-in area includes a control data zone, the control data zone stores physical format information, the physical format information includes first information common to book types; second information peculiar to a book type; and third information peculiar to each kind of second information, the first information includes byte information indicating the book type and a version number, and the second information includes byte information indicating the major digit of a revision number and a disc indicator.

Figure 1:
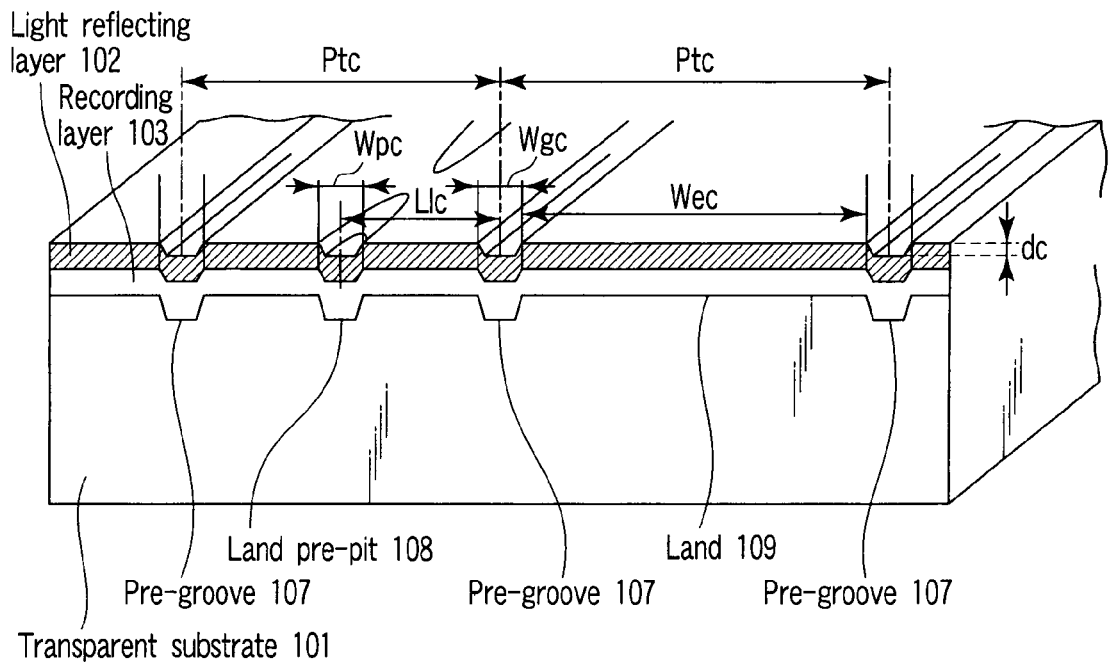
FIG. 1 is an exemplary schematic diagram explaining one example of the structure of a recordable information storage medium.

According to an embodiment, FIG. 1 shows the sectional structure of a current recordable information storage medium (current DVD-R disc).

The current DVD-R disc has a transparent substrate 101, a recording layer 103 and a light reflecting layer 102. The organic dye based material of the recording layer 103 is often formed by spin coating, and the light reflecting layer 102 made of an inorganic substance such as Al or Au (a metal in many cases) is formed adjacently to the recording layer 103 to increase light reflectance. In the surface of the light reflecting layer 102, a step dc is formed to reflect the uneven shapes of a pre-groove 107 and a land pre-pit 108 on the side of the recording layer 103.

In a current rewritable information storage medium (current DVD-RW disc) as well, the pre-groove 107 and the land pre-pit 108 are formed in the transparent substrate 101 in a structure similar to that of the DVD-R disc shown in FIG. 1. However, this disc is different from the current DVD-R disc in that a phase-change recording material is used for the recording layer 103 and a recording mark using the phase change of the recording layer is formed.

The DVD-RW disc is different from the DVD-R disc not only in the material of the recording layer 103 but also in a plurality of layers (a stacked structure composed of a top protective layer and a bottom protective layer across the recording layer, a foundation layer, etc.) of different materials inside the recording layer 103.

Figure 2:
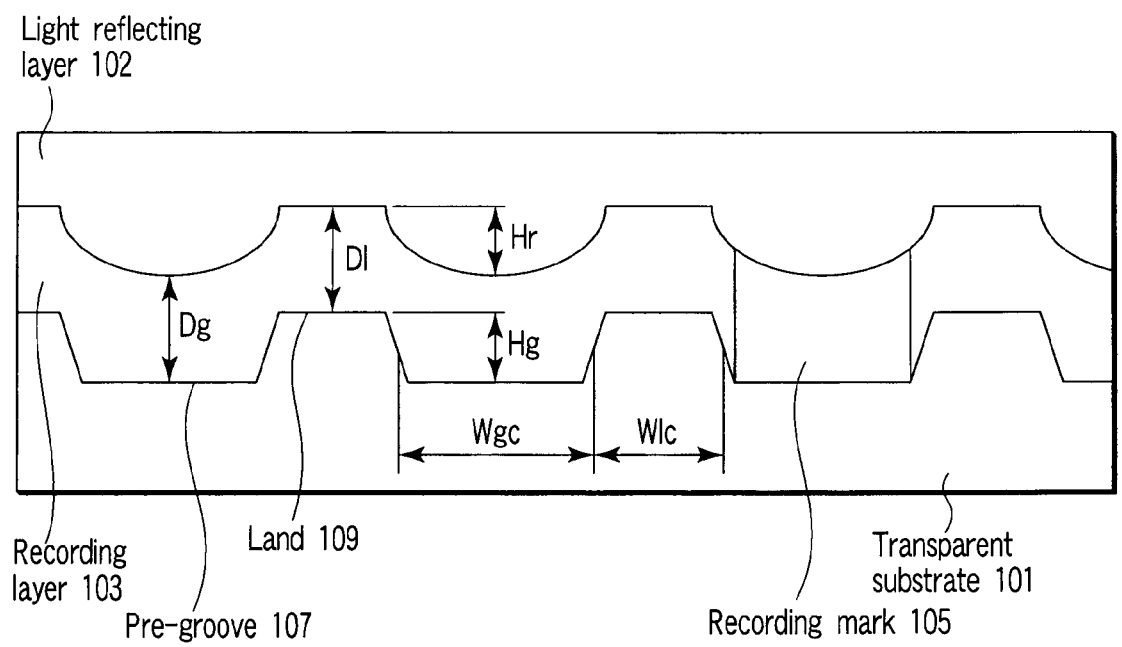
FIG. 2 is an exemplary schematic diagram explaining one example of the sectional structure of an information storage medium different from the recordable information storage medium in FIG. 1.

A microstructure in the information storage medium in the present embodiment is shown in FIGS. 2 and 10B. In FIG. 2, the land pre-pit 108 shown in FIG. 10B is not illustrated.

The organic dye based material described later is used as the material of the recording layer 103 in the recordable information storage medium in the present embodiment. A light reflecting layer 102 made of an inorganic substance such as Ag or an Ag alloy is formed adjacently to the recording layer 103. Although the opposite interface of the light reflecting layer 102 is unevenly shaped as in FIG. 1 in the information storage medium shown in FIG. 2, the thickness of the light reflecting layer 102 is sufficiently great, so that the drawing in FIG. 2 shows the light reflecting layer 102 cut in its center and does not illustrate the uneven shape on the opposite interface.

At the interface between the recording layer 103 and the light reflecting layer 102, uneven shapes of a step Hr are formed in the parts of the pre-groove 107 and the land pre-pit 108.

In the following explanation, an example will be described in which the organic dye based material is used as the material of the recording layer 103 in the recordable information storage medium in the present embodiment. However, the present embodiment is not limited to this, and an inorganic substance may be used as the material of the recording layer 103.

As an example of the use of the inorganic substance as the material of the recording layer 103, a phase-change recording material such as a chalcogenide-based material (in which a recording mark 105 is formed using a phase change) may be used, or a stack of layers may be formed by inorganic layers of a type such as Te—C in which a hole is directly made to form the recording mark 105 or by inorganic layers of different kinds, and a mixture or compound may be formed in the recording mark 105 by thermal diffusion.

In the case of the information storage medium in the present embodiment having the sectional structure shown in FIG. 2, an off-track detection signal using a push-pull method and a detection signal from the land pre-pit 108 are obtained by the diffraction/interference of light reflected on the interface between the recording layer 103 and the light reflecting layer 102 having the step Hr.

Next, the basic principle of the present embodiment will be explained.

The embodiment of the invention provides a recording/reproducing device which changes a wavelength to be used between recording light and reproducing light, and also provides an information storage medium which ensures satisfactory recording characteristics and reproducing characteristics for the recording light and reproducing light different from each other in wavelength.

Furthermore, in the embodiment of the invention, pre-groove shape and dimensions and land pre-pit shape and dimensions are set so that an off-track detection signal and a land pre-pit detection signal are obtained for the recording light and at the same time, the reproducing light is hardly affected by the pre-groove and the pre-pit.

A wavelength of 650±5 nm is assumed for the reproducing light in the current DVD-R disc and DVD-RW disc.

The information storage medium in the present embodiment permits reproduction with light at a wavelength of 650±5 nm in order to ensure reproduction compatibility with the current DVD-R disc and DVD-RW disc.

Using FIGS. 3A and 3B, there will be explained the relation between the pre-groove and the land pre-pit dimensions and the wavelength of the recording light wherein the off-track detection signal and the land pre-pit detection signal can be obtained for the recording light and at the same time, the reproducing light (light at 650±5 nm) is hardly affected by the pre-groove and the pre-pit.

As previously described, the off-track detection signal using the push-pull method and the detection signal from the land pre-pit 108 are obtained by the diffraction/interference of light reflected on the interface (see FIG. 2) between the recording layer 103 and the light reflecting layer 102.

A case will be described where incident lights 114 different in wavelength are applied to both the pre-groove 107 (or the land pre-pit 108) and a land 109 with the step Hr in between.

Figure 3A:
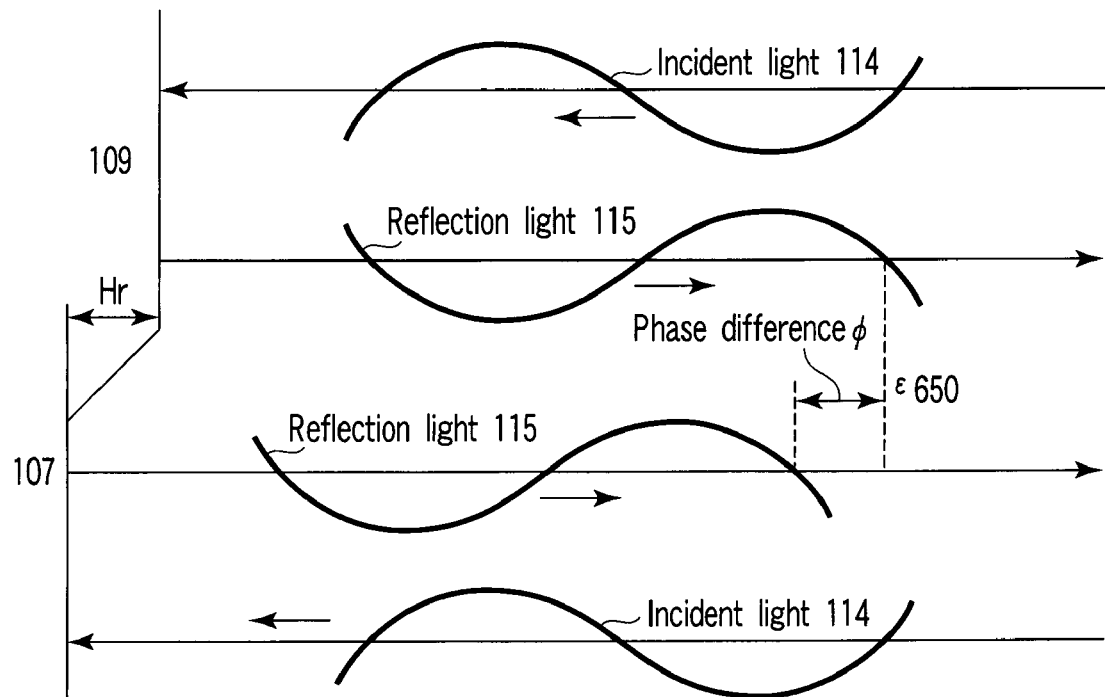
FIGS. 3A and 3B are exemplary schematic diagrams explaining a basic principle used in an embodiment of the present invention.

FIG. 3A shows a case where reproducing light at a wavelength of 650 nm is radiated, and indicates, by $\epsilon_{650}$, a phase difference caused by the step Hr to reflection lights 115 vertically reflected by the pre-groove 107 (or the land pre-pit 108) and the land 109.

Figure 3B:
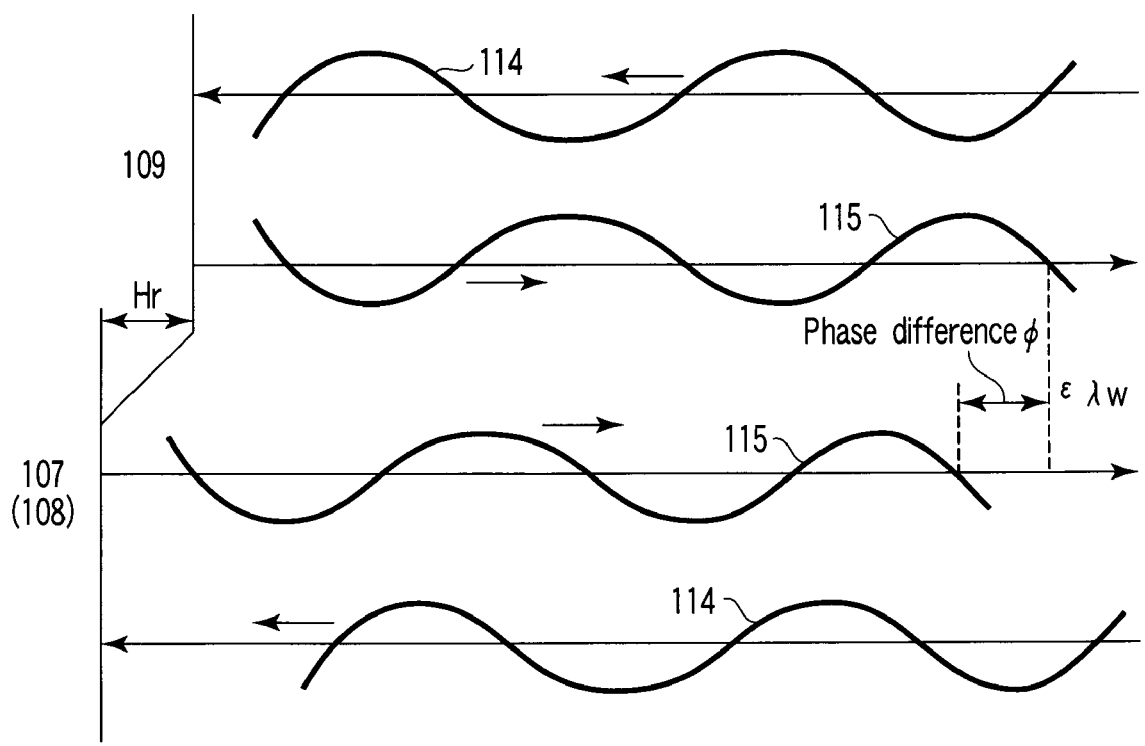

FIG. 3B shows a case where recording light at a wavelength of λw different from the reproducing light is radiated. A phase difference caused by the step Hr to the reflection lights 115 originated from the recording light is $\epsilon_{\lambda w}$.

When the amounts of the steps Hr are equal, a relation of $\epsilon_{650} < \epsilon_{\lambda w}$ is satisfied when λw<650 nm.

When $\epsilon_{650} < \pi$ and $\epsilon_{\lambda w} < \pi$, a higher phase difference ε leads to a greater amount of interference between the reflection lights 115, so that a large off-track detection signal and land pre-pit detection signal are obtained.

On the other hand, a smaller phase difference ε leads to less interference between the reflection lights 115 and hardly leads to an adverse effect of the pre-groove and the pre-pit (characteristic deterioration of a reproduction signal from the recording mark due to a crosstalk signal from the land pre-pit as referred to in the problem of the prior art and due to a decrease in the DC level from the pre-groove) (less characteristic deterioration of the reproduction signal).

Therefore, in the present embodiment, the wavelength λw of the recording light is made shorter than the wavelength (650±5 nm) of the reproducing light (λw<650 nm) so that the off-track detection signal and the land pre-pit detection signal are obtained for the recording light and at the same time, the reproducing light is hardly affected by the pre-groove and the pre-pit.

Any value can be taken for the value of the wavelength λw to be used for the recording light as long as it is smaller than 650 nm.

As the source of a semiconductor laser light of 405 nm is used in an HD DVD or Blu-ray (trademark) disc, using a light source of 405 nm likewise enables inexpensive production of a recording optical head.

Next, an optical head mounted in the recording device will be described.

A focus spot to be focused on the recording layer 103 traces (tracks) over the pre-groove 107 in FIG. 1.

Therefore, when the focus spot is not extremely small-sized, that is, when the focus spot is equal to or more than a given size, a higher ratio of a distance Llc from the center of the pre-groove 107 to the center of the land pre-pit 108 to the focus spot size allows a larger detection signal from the land pre-pit 108.

The numerical aperture (NA) of an objective lens to be used is set to 0.60±0.01 for a reproducing optical head in the current DVD-R disc and DVD-RW disc.

It is known that the size of the focus spot focused on the recording layer 103 is proportionate to λ/NA when the wavelength of light is λ.

Therefore, in the present embodiment, the NA value of the objective lens in the optical head mounted in the recording device is made greater than that of the current reproducing optical head so that the size of the focus spot focused on the recording layer 103 is reduced to increase the land pre-pit detection signal.

The NA value of the objective lens in the optical head mounted in the recording device is required to be greater than 0.6 which is the NA value of the objective lens in the reproducing optical head, but is better at 0.65 or more.

Furthermore, an NA equal to or more than 0.70 or an NA equal to or more than 0.83 permits greater land pre-pit detection signal to be obtained.

While the recording device and the reproducing device are separately described above for ease of explanation, the present embodiment is not limited thereto, and a recording optical head and a reproducing optical head may be prepared in the same device, or the same optical head in the same device may have a recording light source of 405 nm and a recording objective lens of an NA of 0.65 as well as a reproducing light source of 650 nm and a reproducing objective lens of an NA of 0.60.

Moreover, the present embodiment is not limited thereto, and an objective lens of an NA of 0.65 alone may be used, and a detachable aperture (aperture limiting shutter) may be disposed in a light sending system so that the NA of the objective lens may be 0.60 in reproduction.

In the present embodiment, the reproducing optical head in the reproducing device is set to a wavelength of 650 nm and an NA of 0.60 in compliance with current DVD players (with the aim of ensuring compatibility). Instead of this, the wavelength of the light source of the recording optical head in the recording device is shorter than 650 nm (is desirably 405 nm). Further, the NA value of the objective lens used in the recording optical head is greater than 0.60 (is desirably 0.65 nm or more). Thus, the amount of the off-track detection signal (by push-pull) and the amount of the land pre-pit detection signal are greater in recording than in reproduction.

In this manner, the amount of the off-track detection signal and the amount of the land pre-pit detection signal in recording are relatively increased, such that the influence of the land pre-pit detection signal in reproduction is reduced, and the amount of the off-track detection signal in reproduction is decreased, thereby making it possible to prevent a decrease in the DC level from the pre-groove 107 and prevent a decrease in the characteristic reliability of reproduction from the recording mark in reproduction.

Thus, in the present embodiment, the ranges of the shape and dimensions of the pre-groove 107 and the shape and dimensions of the land pre-pit 108 are regulated using the difference of wavelength between the recording light and the reproducing light.

As has been described with FIG. 2, the amount of the land pre-pit detection signal and the amount of the off-track detection signal are determined by the light (the reproducing light in this case) reflected on the interface between the recording layer 103 and the light reflecting layer 102.

If a refractive index in the recording layer 103 in the case of the reproducing light at 650±5 nm is $n_{650}$, the maximum land pre-pit detection signal and off-track detection signal are detected when the depth (step) Hr of the pre-groove equal to the depth (step) of the land pre-pit is $650/(8 \times n_{650})$.

Therefore, in the present embodiment, as a condition for not being influenced by this in reproduction, the depth (step) of the pre-groove and the depth (step) Hr of the land pre-pit are set equal to or more than $650/(16 \times n_{650})$ or less which is half of $650/(8 \times n_{650})$.

As a condition for less influence, it is desirable to set them to $650/(32 \times n_{650})$ or less which is half of $650/(16 \times n_{650})$.

The depth (step) Hr of the pre-groove at the interface between the recording layer 103 and the light reflecting layer 102 will be examined in further detail.

After the reflection lights 115 shown in FIGS. 3A and 3B have passed through the objective lens, the amounts of the reflection lights 115 are detected by a dual detector arranged in the radial direction of the information storage medium.

Signal amounts detected in detection cells of this photodetector are indicated by l1 and l2.

In a current DVD-R standard, $$0.22 < |l1 - l2|_{ac} / |l1 + l2|_{dc} < 0.44 \qquad (1)$$

is set as the range of the off-track detection signal.

As a condition for reducing the influence of the off-track detection signal in reproduction and preventing a decrease in the DC level from the pre-groove 107, $$||l1-l2|_{ac}/|l1+l2|_{dc}<0.22 \tag{2}$$

is set as the range of the detection signal characteristics in reproduction in the present embodiment.

Equation (2) is the minimum requirement, and in order to allow for a margin, $$||l1-l2|_{ac}/|l1+l2|_{dc}<0.11 \tag{3}$$

which narrows the condition of Equation (2) by half is desirable as a condition for reducing the influence of the off-track detection signal in reproduction and enabling the prevention of a decrease in the DC level from the pre-groove 107.

In the current DVD-R standard, $$0.18<|l1-l2|_{o\text{-}p}/|l1-l2|_{dc}<0.28 \tag{4}$$

is set as the range of the land pre-pit detection signal. Thus, as a condition for reducing the influence of the crosstalk from the land pre-pit in reproduction, $$|l1-l2|_{o\text{-}p}/|l1+l2|_{dc}<0.18 \tag{5}$$

is set as the range of the detection signal characteristics in reproduction in the present embodiment.

Likewise, as a condition for allowing for a margin, $$|l1-l2|_{o\text{-}p}/|l1-l2|_{dc}<0.09 \tag{6}$$

which narrows the condition of Equation (5) by half is better.

In the above Equation, a direct current component for l1+l2 which is the sum of signals obtained in the two detection cells when the focus spot has crossed over the pre-groove 107 and the land 109 a plurality of times is defined as $|l1+l2|_{dc}$, and the difference amplitude (alternating current component) of the signals obtained in the two detection cells is defined as $|l1-l2|_{ac}$.

A simulation was run with regard to the depth (step) Hr of the pre-groove at the interface between the recording layer 103 and the light reflecting layer 102 for satisfying Equation (2).

As a simulation condition, a track pitch Ptc (see FIG. 1) was fixed to 0.74 μm similar to that of the current DVD-R.

The sectional shape of the pre-groove at the interface between the recording layer 103 and the light reflecting layer 102 is assumed to be trapezoidal as in FIG. 1, and the inclination angle of the right and left inclined surfaces of the pre-groove 107 is set at 50 degrees (90 degrees in the case of vertical wall surfaces), and the widths in the centers of the inclined surfaces are defined as a land width and a groove width.

Figure 4:
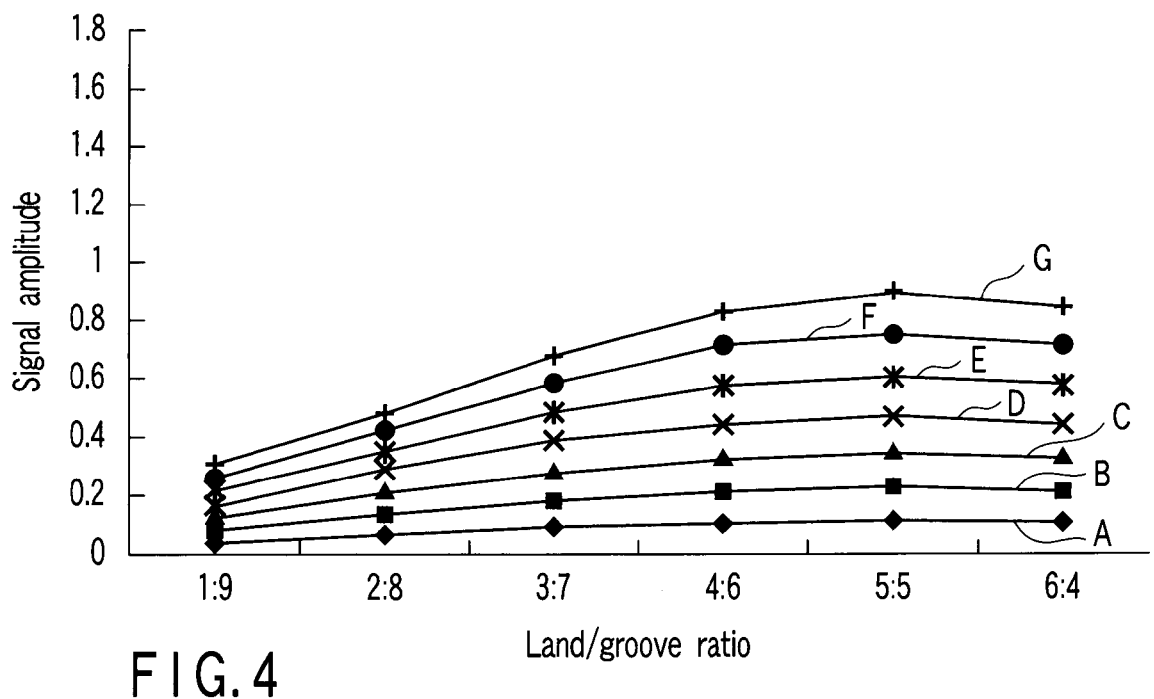
FIG. 4 is an exemplary graph explaining the relation between the groove depth and the push-pull signal amplitude when light at a wavelength of 650 nm is focused by an objective lens with an NA of 0.6.

FIG. 4 shows a simulation result showing the relation between the pre-groove depth Hr and the push-pull signal amplitude when reproducing light at a wavelength of 650 nm is focused by an objective lens with an NA of 0.60. In FIG. 4, a curve "A" indicates an example of a groove depth of 10 nm, a curve B indicates an example of a groove depth of 20 nm, a curve C indicates an example of a groove depth of 30 nm, a curve D indicates an example of a groove depth of 40 nm, a curve E indicates an example of a groove depth of 50 nm, a curve F indicates an example of a groove depth of 60 nm, and a curve G indicates an example of a groove depth of 70 nm.

The value of a vertical axis in FIG. 4 indicates $$|l1-l2|_{ac}/|l1+l2|_{dc} \tag{7}$$

shown in Equation (1).

In FIG. 4, the pre-groove depth Hr is used as a parameter, in order to calculate the value of Equation (7) when the ratio between the land width and the groove width in the centers of the inclined surfaces of the trapezoid is changed. An A/W value (A: the diameter of the objective lens, W: the diameter of an 1/e$^2$ width with respect to a central intensity in an incident light intensity distribution) indicating the beam charge rate of incident light entering the objective lens is 0.3058 in a circumferential direction and 0.1513 in a radial direction.

Figure 5:
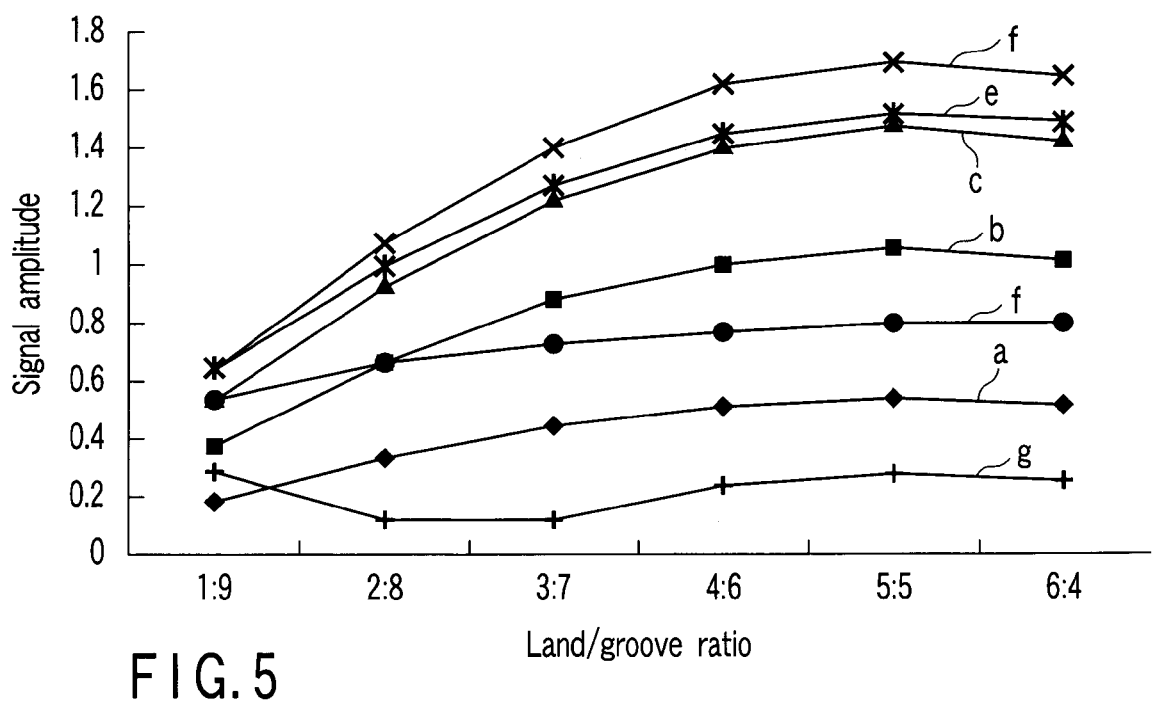
FIG. 5 is an exemplary graph explaining the relation between the groove depth and the push-pull signal amplitude when light at a wavelength of 405 nm is focused by an objective lens with an NA of 0.65.

FIG. 5 shows a simulation result in the case where recording light at a wavelength of 405 nm is focused by an objective lens with an NA of 0.65 under the same condition. In addition, in FIG. 5, "a" to "g" of the respective curves indicate groove depths and correspond to the respective capital letters "A" to "G" in FIG. 4.

In the example of FIG. 5, A/W is valued at 0.3331 in the circumferential direction and at 0.3331 in the radial direction.

It is obvious that far greater push-pull signal amplitude is obtained in FIG. 5 than in FIG. 4.

Figure 6:
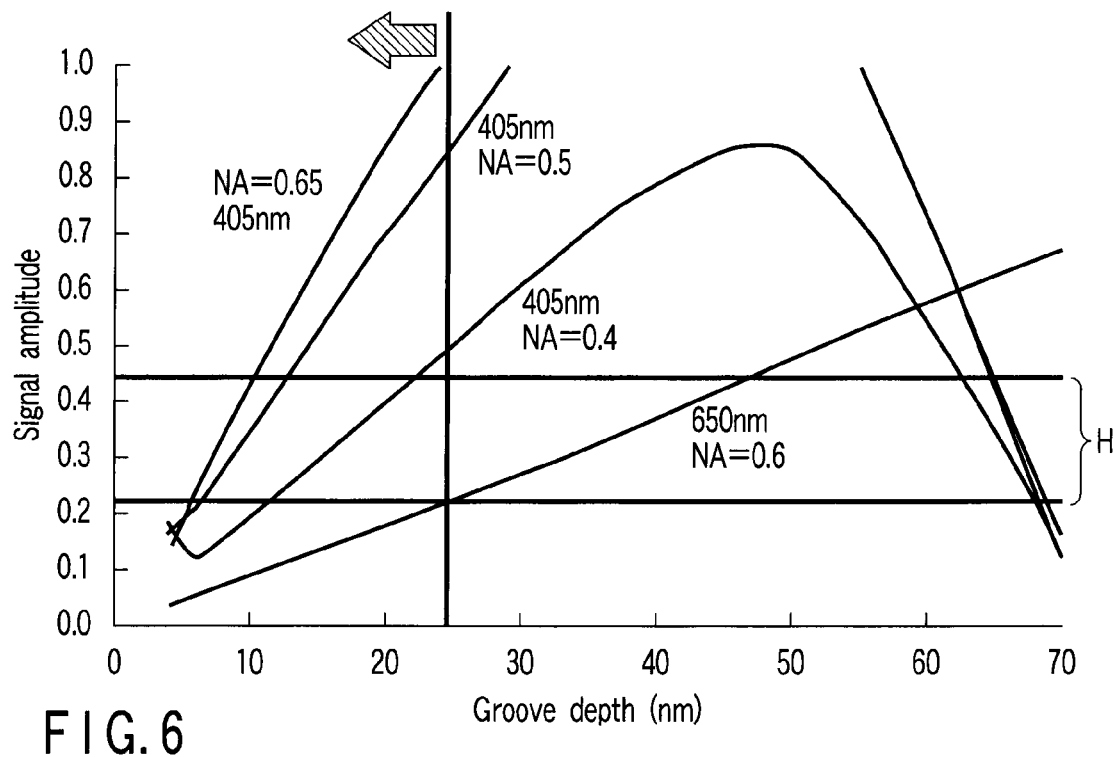
FIG. 6 is an exemplary graph showing the range of pre-groove depth satisfying a condition which can decrease the push-pull signal amplitude when the light at a wavelength of 650 nm is focused by the objective lens with an NA of 0.6 and which can increase the push-pull signal amplitude when the light at a wavelength of 405 nm is focused (a graph explaining the relation between the push-pull signal amplitude and the groove depth when the light at a wavelength of 405 nm is focused by objective lenses with different NAs while the push-pull signal amplitude by the light at a wavelength of 650 nm is set at a predetermined intensity)

FIG. 6 shows the calculation result of FIG. 4 and the calculation result of FIG. 5 in an overlapping manner with a horizontal axis as the groove depth.

The range of Equation (1) is the "amplitude range condition of the push-pull signal set on the DVD-R standard" indicated by an area H in FIG. 6.

It is obvious that the depth (step) Hr of the pre-groove at the interface between the recording layer 103 and the light reflecting layer 102 has only to be 20 nm or less as a condition for satisfying Equation (2).

It is obvious from FIG. 6 that, under this condition, sufficiently great push-pull signal amplitude is also obtained with the recording light at a wavelength of 405 nm which has passed through the objective lens with an NA of 0.65.

It is obvious from FIG. 6 that the depth (step) Hr of the pre-groove at the interface between the recording layer 103 and the light reflecting layer 102 has only to be 10 nm or less as a condition for satisfying Equation (3).

FIG. 6 shows that the condition of Equation (1) is satisfied if the depth (step) Hr of the pre-groove is within $$60\text{ nm} \leq Hr \leq 100\text{ nm} \tag{8}$$

when the recording light at 405 nm is radiated with an NA of 0.65.

Therefore, in the present embodiment, the range of the depth (step) of the pre-groove is set within the range of Equation (8).

The present embodiment will be explained in connection with the recording layer 103 which has the structure shown in FIG. 2 and which permits recording with the recording light at a wavelength of 405 nm and which enables sufficiently great reproduction signal amplitude from the recording mark 105 with the reproducing light at a wavelength of 650 nm.

The standard of a current read-only DVD-ROM mentions that:

the reflectance for the reproducing light at 650 nm, in the case of circularly polarized incidence, is within $$45\text{ to }85\%\text{ in a single layer disc, and}$$

$$18\text{ to }30\%\text{ in a dual-layer disc} \tag{9},$$

and the reflectance for the reproducing light at 650 nm, in the case of noncircularlyo polarized (linear polarized) incidence, is within $$60\text{ to }85\%\text{ in a single layer disc, and}$$

$$18\text{ to }30\%\text{ in a dual-layer disc} \tag{10}.$$

Therefore, a recording film is designed so that the reflectance for the reproducing light at 650 nm may fall within 45 to 85% (18 to 30% in the case of a multi-layer disc) for the information storage medium of the present embodiment as well.

Specifically, in the present embodiment, AgBi is used as the material of the light reflecting layer 102 shown in FIG. 2 in order to obtain the high light reflectance.

The present embodiment is not limited to this, and a silver alloy or simple silver may be used as the material of the light reflecting layer 102.

In regard to the modulation factor of the reproduction signal from the recording mark 105 on the standard of the current DVD-ROM disc, a value $I_{14H}$ at which the reproduction signal is maximized when viewed from a 0 level, and a value $I_{14L}$ at which the reproduction signal is minimized are set to satisfy $$(I_{14H} - I_{14L})/I_{14H} \geq 0.60 \tag{11}$$

so that in the present embodiment as well, the characteristics of the recording film are elaborated to satisfy Equations (9) to (11).

Figure 7:
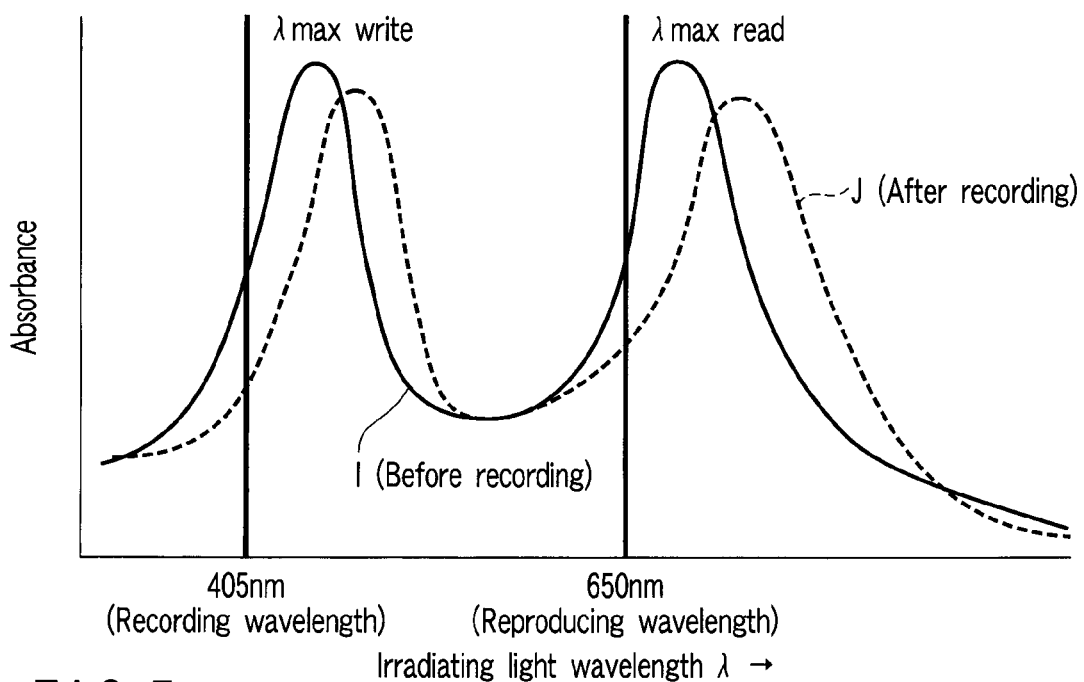
FIG. 7 is an exemplary graph showing one example of the light absorption spectrum characteristics of a Low-to-High type organic dye recording material.

FIG. 7 shows the light absorption spectrum of an organic dye recording material used in the recording layer 103 in the present embodiment. In FIG. 7, a curve I indicates the absorption (absorbance) of the organic dye material before recording, and a curve J (dotted line) indicates the absorption (absorbance) of the organic dye material after recording.

The present embodiment is characterized in mixing (combining) an organic recording material to be recorded by the recording light at 405 nm with an organic recording material in which the amount of light reflection is changed at the recording mark 105 by the reproducing light at 650 nm.

As the organic recording material used in the present embodiment and recorded by the recording light at 405 nm, use is made of a recording material of a Low-to-High type (the reflectance is higher in a recorded part (recording mark) than in an unrecorded part) which has been disclosed in Pat. Appln. No. 2005-024303 (Jpn. Pat. Appln. KOKAI Publication No. 2006-205683) by the present applicant.

As described in Jpn. Pat. Appln. KOKAI Publication No. 2006-205683, the value of the maximum absorption wavelength $\lambda_{max}$ write of the organic recording material recorded by the recording light at 405 nm is set to a value greater than 405 nm which is the wavelength of the recording light, thereby preventing deterioration in reproduction and ensuring long-term recording stability.

As shown in FIG. 7, the recording material used in the present embodiment is lower in absorbance after recording than before recording with respect to the light at a wavelength of 405 nm.

The light at 405 nm enters from the side of the transparent substrate 101 in FIG. 2, and reflected by the light reflecting layer 102 through the recording layer 103, and then again returns to the recording layer 103.

As the light absorption in the recording mark 105 decreases along this optical path, the amount of the returning reflection light becomes higher (the amount of the reflection light is H: high) than in other parts (the amount of the reflection light is L: low).

At this point, a pit or hole is not made in the recording mark 105, but as described in detail in Jpn. Pat. Appln. KOKAI Publication No. 2006-205683, an electron orbit changes in a molecule due to a molecular arrangement change or a small molecular structure change, resulting in the change of optical characteristics.

In a specific organic recording material in the present embodiment, hemicyanine cation is combined with a material in which 10% of an azo dye unconverted to a metal complex is added for higher sensitivity to azo Co dye complex anions using cobalt (Co) as a central metal (one kind of an azo metal complex).

The present embodiment is not limited to this, and may use a material combining monomethyncyanine cation with a material in which 10% of an azo dye is added to azo Co dye complex anions.

As another application, styril cation may be combined with a material in which 10% of an azo dye is added to azo Co dye complex anions, or a simple azo Co complex using copper (Cu) as a central metal or a simple azo Ni complex using nickel (Ni) as a central metal may be used.

A material described in Pat. Appln. No. 2005-116466 (Jpn. Pat. Appln. KOKAI Publication No. 2006-289878) by the present applicant may be used as the organic recording material in which the amount of light reflection is changed by the reproducing light at 650 nm.

Furthermore, in the present embodiment, recording/reproducing characteristics are stabilized by adapting the molecular level thermal structure changing temperature or decomposition temperature of the organic recording material in which the amount of light reflection is changed by the reproducing light at 650 nm to the organic recording material recorded by the recording light at 405 nm.

The temperature of the organic recording material recorded by the recording light at 405 nm increases during the formation of the recording mark 105, and a molecular arrangement change or a small molecular structure change is caused. However, a molecular arrangement change or a small molecular structure change is also caused in the organic recording material in which the amount of light reflection is changed by the reproducing light at 650 nm in response to the above temperature change, which produces a principle that the amount of light reflection in the recording mark 105 also changes with regard to the reproducing light at 650 nm.

Specifically, the decomposition temperature of the above-mentioned organic recording material recorded by the recording light at 405 nm is 230 to 250 degrees centigrade, and the organic recording material in which the amount of light reflection is changed by the reproducing light at 650 is thus adjusted to that temperature.

In the present embodiment, a specific organic recording material in which the amount of light reflection is changed by the reproducing light at 650 is a combination of azo Co dye complex anions with pentamethyncyanine cation.

The present embodiment is not limited to the above, and a simple azo Cu complex may be used.

When the above-mentioned recording material is used at a wavelength of 650 nm, the material shows Low-to-High characteristics in which the light absorption in the recording mark 105 decreases after recording than before recording.

As shown in FIG. 7, the value of the maximum absorption wavelength $\lambda_{max}$ read of the organic recording material in which the amount of light reflection is changed by the reproducing light at 650 nm is set at a wavelength side longer than 650 nm which is the wavelength of the reproducing light, thereby increasing the amplitude of the reproduction signal from the recording mark 105 in a Low-to-High type recording characteristics.

As the amount of light reflection decreases (High-to-Low type) in a recording pit part in the current DVD-ROM disc, recording processing on the land 109 is carried out in the present embodiment as finalizing processing after the formation of the recording mark 105 in order to obtain compatibility.

The present embodiment is not limited to the above, and recording on the land 109 may be carried out in a factory immediately after the manufacture of the information storage medium as part of a characteristic inspection before shipment.

In the present embodiment, the mixing ratio (mass ratio) of the organic recording material is set so that an amount of the organic recording material for changing the light reflection for the reproducing light at 650 nm is larger than an amount of the organic recording material for recording using the recording light at 405 nm, therefore, increased amplitude of the reproduction signal from the recording mark 105 by the reproducing light at 650 nm can be obtained.

Suitable recording/reproducing characteristics are obtained when the ratio of [the amount of the organic recording material for changing the light reflection for the reproducing light at 650 nm]:[the amount of the organic recording material for recording using the recording light at 405 nm] is 7:3.

The present embodiment is not limited to this, and this value may be 9:1.

Figure 8:
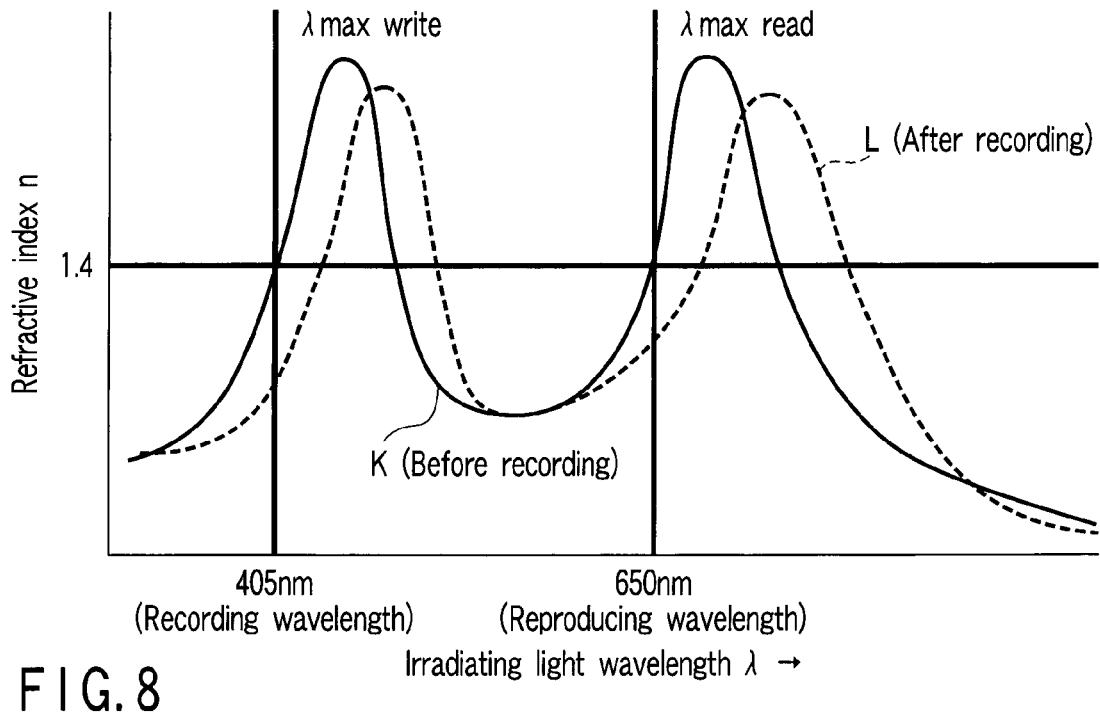
FIG. 8 is an exemplary graph showing one example of the refractive index characteristics of a Low-to-High type organic dye recording material.

FIG. 8 shows the refractive index characteristics of the Low-to-High type organic dye material having the light absorption spectrum shown in FIG. 7. In FIG. 8, a curve K indicates the refractive index of the organic dye material before recording, and a curve L (dotted line) indicates the refractive index of the organic dye material after recording.

It is obvious that the refractive index changes before and after recording with regard to the light at a wavelength of 650 nm.

The present embodiment uses not only the change of absorbance shown in FIG. 7 but also an interference phenomenon utilizing the refractive index change in order to obtain a high modulation factor as shown in Equation (11).

In FIG. 2, the reproducing light at 650 nm is reflected not only on the interface between the light reflecting layer 102 and the recording layer 103 but also on the interface between the recording layer 103 and the transparent substrate 101, and the phases of these reflection lights are shifted from each other to a large extent, such that these reflection lights interfere with each other, resulting in a decrease in the total amount of reflection light.

The refractive index decreases as shown in FIG. 8 in the recording mark 105, so that the amount of phase shift of these reflection lights decreases, resulting in an increase in the total amount of reflection light.

In the present embodiment, the thickness Dg of the recording layer 103 in the pre-groove 107 is optimized to achieve the above-mentioned effect.

As a result of an experiment under a changed condition, it has been found out that the maximum amplitude of the detection signal from the recording mark 105 is obtained when the thickness Dg of the recording layer 103 in the pre-groove 107 is 60 nm, and that the proper range of the thickness Dg is 30 to 90 nm.

In the present embodiment, the shapes and dimensions of the pre-groove 107 and the land pre-pit 108 are optimized in accordance with the material of the recording layer 103.

As the recording layer 103 is formed by spin coating in the present embodiment, the thickness Dl of the recording layer 103 in the land 109 is smaller than the thickness Dg of the recording layer 103 in the pre-groove 107, as shown in FIG. 2.

Therefore, the depth (step) Hg of the pre-groove 107 on the transparent substrate 101 for satisfying both the condition of Equation (8) and the above-mentioned range of Dg is set within 20 to 33 nm.

It has been found out from the result of the experiment that when the depth (step) Hg of the pre-groove 107 on the transparent substrate 101 is 15 nm or less, the thickness Dg of the recording layer 103 is not great, and the amplitude of the reproduction signal from the recording mark 105 is low.

As pointed out in the problem of the prior art, there has been caused a problem that the amplitude of the reproduction signal from the recording mark decreases if the DC level from the pre-groove 107 in reproduction decreases.

In order to solve the above-mentioned problem, the width Wgc of the pre-groove 107 is set at 250 to 380 nm in the present embodiment.

Although not shown, the pre-groove 107 is wobbled to make it easier to synchronize rotations and signals in the present embodiment.

An excessively high value of the wobble amplitude has an adverse effect on the characteristics of the reproduction signal from the recording mark 105.

In the present embodiment, the wobble amplitude is set to be equal to or less than 15 $nm_{p-p}$ (5 $nm_{p-p}$ more suitable) to maintain satisfactory characteristics of the reproduction signal from the recording mark 105 (stabilize the characteristics of the reproduction signal).

As pointed out in the problem of the prior art, the mixing of a crosstalk signal from the land pre-pit 108 has an adverse effect on the characteristics of the reproduction signal from the recording mark 105.

Therefore, in the present embodiment, the shape and dimensions of the land pre-pit 108 are technically elaborated to reduce the mixing of the crosstalk signal from the land pre-pit 108.

As shown in FIGS. 1 and 10A, the shape of the land pre-pit 108 is unevenly formed in the current DVD disc.

In this case, the effect of the crosstalk is great due to a great signal change (including swingback) at the boundary of a pit.

On the contrary, in the present embodiment, a part of the pre-groove 107 is curved or wobbled as shown in FIG. 10B to form the land pre-pit 108.

As a result, the amount of signal changes before and after the land pre-pit 108 can be properly controlled to maintain satisfactory characteristics of the reproduction signal from the recording mark 105.

In the present embodiment, the curve or wobble length Lpc of the pre-groove 107 in the land pre-pit 108 is 400 nm, and the curve or wobble amplitude Wpc is 300 nm.

Figure 9:
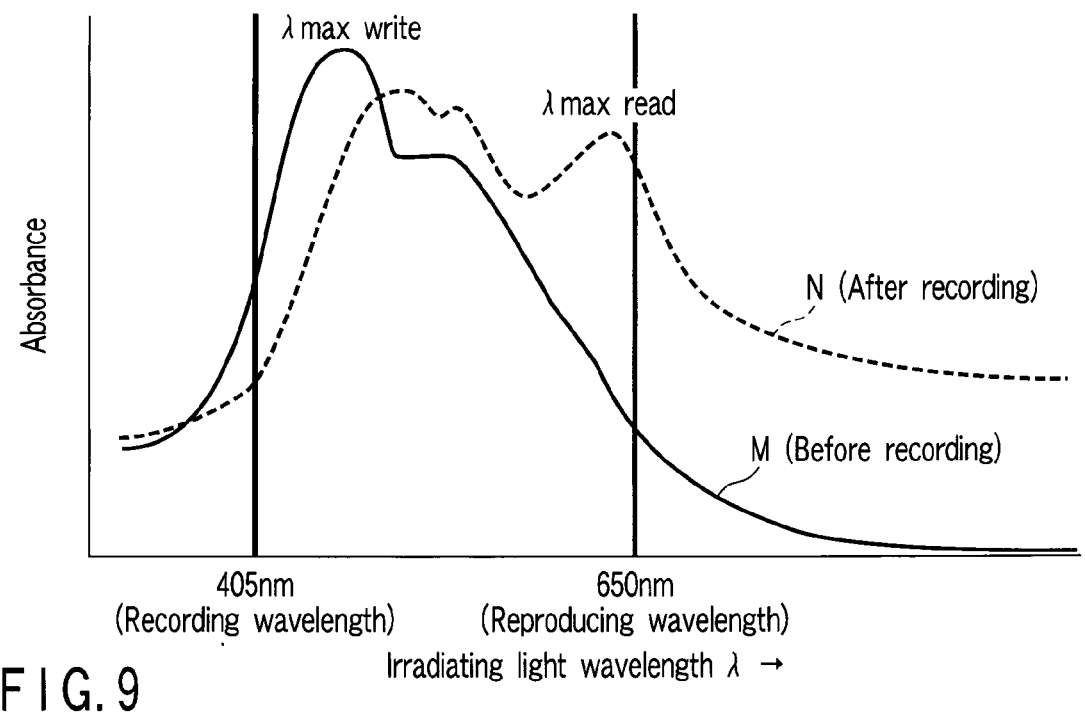
FIG. 9 is an exemplary graph showing one example of the light absorption spectrum characteristics of a High-to-Low type organic dye recording material.

FIG. 9 shows the light absorption spectrum in the case of using the organic recording material used for the recording layer 103 in the present embodiment in an alternative embodiment. In FIG. 9, a curve M indicates the absorption (absorbance) of the organic dye material before recording, and a curve N (dotted line) indicates the absorption (absorbance) of the organic dye material after recording.

The above-mentioned High-to-Low type recording material is used as the organic recording material for recording using the recording light at 405 nm, and a thermosensitive dye material which blackens in a recorded place is used as the organic recording material for changing the amount of light reflection by the reproducing light at 650 nm.

The use of the thermosensitive dye material provides a High-to-Low type recording material which significantly increases absorbance by a wavelength of 650 nm of the reproducing light after recording and decreases the reflection amount of the reproducing light.

The alternative embodiment shown in FIG. 9 is characterized in that the value of the maximum absorption wavelength $\lambda_{max}$ read of the organic recording material in which the amount of light reflection is changed by the reproducing light at 650 nm after recording is set lower than 650 nm which is the wavelength of the reproducing light in order to increase the amount of absorbance change before and after recording and satisfy the condition of Equation (11).

The information storage medium in the present embodiment is used for the network distribution of image information as shown in FIG. 15. A video information distribution system comprises an encryption key issuing company 2, a retail store 5, an end user 6, a DVD license company 7, an agent company 8, an information storage medium manufacturing company 9 and a particular information production company 54. The retail store 5 has an information recording device 55.

Encrypted particular information 42 (video contents 11) transferred from the particular information production company (contents provider) 54 via a network is recorded in an information storage medium 10 using the recording light at 405 nm in the information recording (copying) device 55 located in the retail store (service anchor) 5.

The information storage medium 10 thus recorded is sold to the end user 6, and the end user 6 has the particular information 42 (video contents 11) reproduced using the reproducing light at 650 nm.

In the present embodiment, the following two ways of using the information storage medium 10 is assumed:

One way is called manufacturing on demand (MOD) wherein encrypted particular information 45 (video contents 11) is distributed on the network to the retail store 5 from the particular information production company 54 and recorded in the information storage medium 10 in the retail store 5, as shown in FIG. 15.

The other way is called electric sell through (EST) wherein information is distributed on the network from the particular information production company 54 directly to the end user 6 and recorded in the information storage medium 10 using the recording light at 405 nm in a recording device owned by the end user 6.

Figure 11:
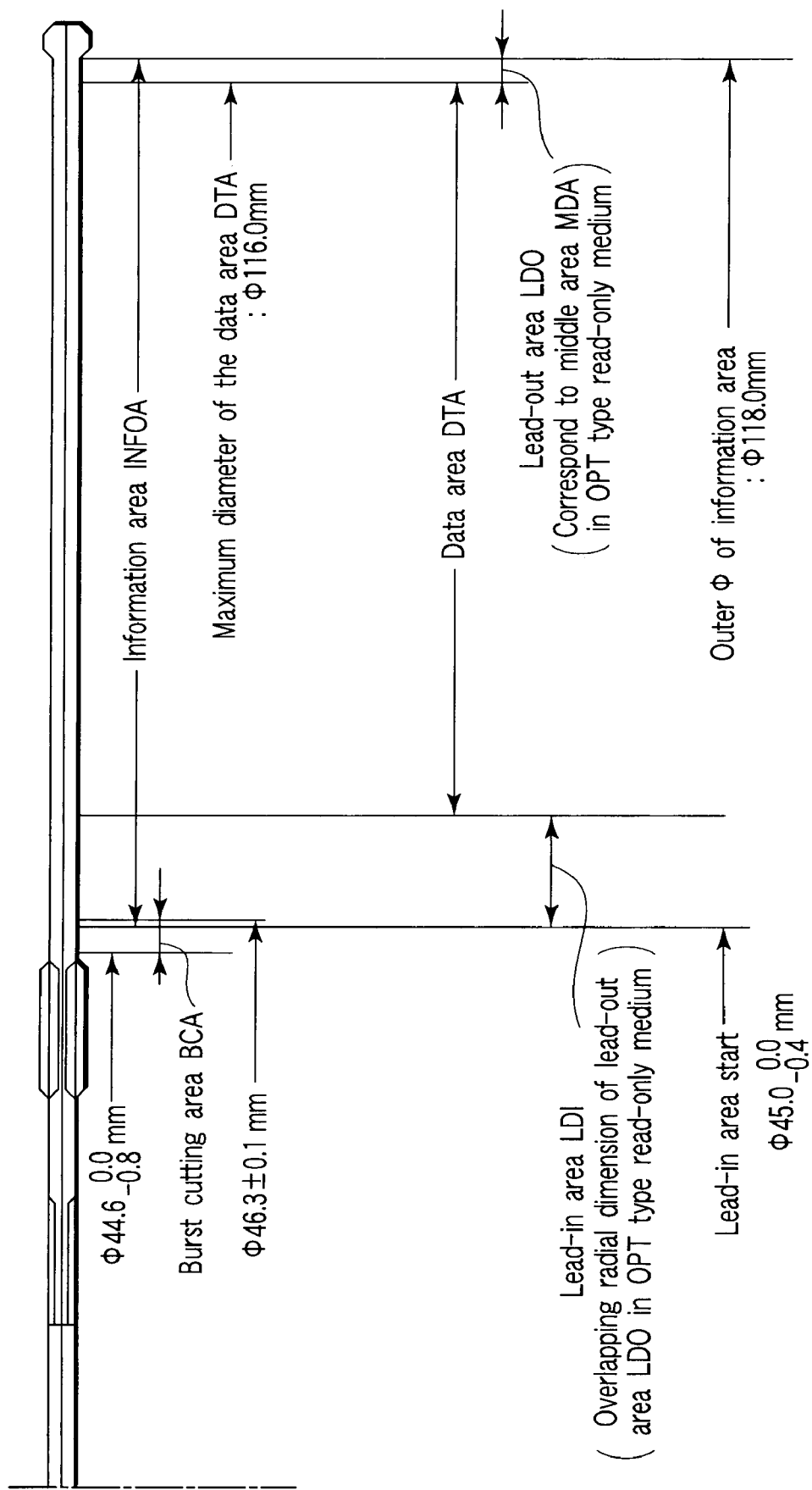
FIG. 11 is an exemplary schematic diagram explaining the structure of a recording area in the recordable information storage medium in FIG. 2.

A macro structure in the information storage medium of the present embodiment is shown in FIG. 11.

In the present embodiment, information is recorded in a lead-in area LDI by forming the recording mark 105 with the recording light at 405 nm after the formation of the information storage medium.

FIGS. 12A to 12D are diagrams showing the data structure of the information storage medium in the present embodiment. As shown in FIG. 12A, in this structure, there are arranged, from the inner peripheral side, a disc test zone DKTZ (not shown), a burst cutting area BCA (not shown), the lead-in area LDI, a data area DTA and a lead-out area (not shown). In the lead-in area LDI, recording is performed in an emboss (pre-pit) form in a conventional read-only and rewritable information storage medium and in an emboss or pre-record (recording in a factory) form in a conventional recordable information medium. On the other hand, in the recordable and rewritable information storage medium of the present embodiment, additional recording (rewriting in a rewritable/re-recordable type) of new information by the formation of the recording mark can be performed in the lead-in area LDI.

The lead-in area LDI includes, from the inner peripheral side, an initial zone INZ, a reference code zone RCZ, a buffer zone BFZ1, a control data zone CDZ and a buffer zone BFZ2.

The initial zone INZ indicates the starting position of the lead-in area LDI. As significant information recorded in the initial zone INZ, physical sector numbers are discretely arranged. Information having a data frame structure composed of a data ID, IED (ID error detection code), main data for recording user information and an error detection code (EDC) is recorded in one physical sector, and information having this data frame structure is also recorded in the initial zone INZ. However, all information in the main data for recording the user information is set to "00h" in the initial zone INZ, so that the significant information in the initial zone INZ is the above-mentioned data ID information alone. A current position can be known from the information on the physical sector numbers recorded in this data ID information. That is, in the case where reproduction is started from the information in the initial zone INZ when information is reproduced from the information storage medium, information on the physical sector numbers or logical sector numbers recorded in the data ID information is first extracted to check the current position in the information storage medium, thus moving to the control data zone CDZ.

As shown in FIG. 12B, the control data zone CDZ comprises physical format information PFI and Disc-related information DMI.

The buffer zone 1 BFZ1 comprises 30 ECC blocks, and the buffer zone 2 BFZ2 comprises 32 ECC blocks. All information in the main data is set to "00h" in the buffer zone 1 BFZ1 and the buffer zone 2 BFZ2 as in the initial zone INZ.

The reference code recording zone RCZ is located before the buffer zone 1 and comprises 2 ECC blocks. This is an area used for the adjustment of a reproducing circuit in the reproducing device, and records a special signal pattern.

The disc test zone DKTZ is an area provided for the manufacturer of the information storage medium to run a quality test (evaluation).

A drive test zone DRTZ is secured as an area for the information recording/reproducing device to perform test writing before recording information on the information storage medium. The information recording/reproducing device performs the test writing in this area in advance, and determines the optimum recording conditions (write strategy), and can then record the information in the data area DTA under the optimum recording conditions.

As shown in FIG. 12C, the disc-related information DMI includes disc manufacturer information 252 and other information 253.

This arrangement of the information zones is completely the same as that of the conventional read-only type, leading to the improvement of reproduction compatibility in conventional players.

The arrangement is different in the DVD-R which is the conventional recordable disc and in the DVD-RW which is a rewritable disc wherein a buffer zone and an R physical format information zone PIZ having contents closely resembling those of the control data zone CDZ are located after an initial zone and wherein an information area called a special border zone is disposed instead of the buffer zone 2.

As shown in FIG. 12C, the physical format information PFI is information of 2048 bytes, and the kind of information to be recorded is set in accordance with the recorded place (relative byte position from the head). That is, byte positions BP0 to BP31 store information 261 common to a DVD family, and byte positions BP32 to BP2047 store information peculiar to the respective standards. The byte positions BP32 to BP511 are areas peculiar to the respective standards, and medium identification information (disc identifier) 262 is stored in the byte positions BP511. The byte positions BP512 to BP2047 are areas peculiar to each data of the byte position BP511, and store information 263 peculiar to the type and version of each standard, and write strategy information 264.

In this manner, positions to arrange information in the physical format information are common on the basis of the contents of the information such that the places of the recorded information are common regardless of the kind of the medium, thereby achieving common and simplified reproducing processing in the information reproducing device or information recording/reproducing device.

As shown in FIG. 12D, as the information 261 common to the DVD family, common information 267 recorded in the read-only type, rewritable/re-recordable type and recordable type is recorded in the byte positions BP0 to BP16, and common information 268 recorded in the rewritable/re-recordable type and recordable type (not recorded in the read-only type) is recorded in the byte positions BP17 to BP31.

FIG. 13 shows the specific contents of the physical format information PFI shown in FIG. 12, and a comparison among the kinds of media (the read-only type, rewritable/re-recordable type and recordable type) in the physical format information PFI.

As the common information 267 recorded in all of the read-only type, rewritable/re-recordable type and recordable type within the information 261 common to the DVD family, there are recorded, in the byte positions BP0 to BP16 in order, information on the type (read-only/rewritable/recordable) (higher 4 bits) and version number (lower 4 bits) of the standard document, information on the size (diameter) of the medium and the maximum possible data transfer rate, information on the structure of the medium (single layer disc or dual-layer disc, whether there is an emboss pit/recordable/ rewrite area), information on recording density (linear density and track density), information on the place where the data area DTA is located, and information on whether the burst cutting area BCA is present (present in the present embodiment in each case).

A book type is allocated to each standard document of the DVD forum. For example, 0000b is allocated to the read-only (ROM) standard and the recordable standard of a content scramble system (CSS) managed recording disc, 0001b is allocated to the rewritable (RAM) standard, 0010b is allocated to the recordable (R) standard, 0011b is allocated to the re-recording (RW) standard, and the rest are reserved. A part version indicating a predetermined code allocated to each version of the standard document of the DVD forum is stored in lower 4 bits of the byte position BP0.

As the common information 268 which is the information 261 common to the DVD family and which is recorded in the conventional rewritable/re-recordable type and recordable type in common, there are recorded revision number information sequentially specifying the maximum recording speeds in 17th byte to 27th byte, revision number information specifying the maximum recording speeds, a revision number table (application revision number), class state information, and extended (part) version number. The byte positions BP28 to BP31 are designated as reserved areas.

The disc of the present embodiment is recognized as a read-only disc in the reproducing device, so that even if it were actually a recordable or rewritable disc, the value 0000b indicating the read-only (ROM) standard is recorded in the higher 4 bits of the byte position BP0, and values similar to those of the read-only disc are recorded up to the byte positions BP16, and the byte positions BP17 to BP31 are designated as reserved areas as in the read-only type.

Next will be explained the meaning of the information peculiar to each type of the standard document and the information contents 263 which can be peculiarly set to each value of the identification information (disc identifier or page descriptor) 262 in the byte position BP511 of the peculiar information. The information peculiar to each type of each standard document in the byte positions BP32 to BP511 is defined by the information on the type and version number of the standard document recorded in the byte position BP0. The information contents 263 in the byte positions BP512 to BP2047 which can be peculiarly set to each value of the identification information (disc identifier) 262 in the byte position BP511 allow not only the difference of type between the rewritable information storage medium and the recordable information storage medium, but also the difference of the meaning of the contents of information recorded in each byte position if the value of the identification information (disc identifier) 262 is different in the media of the same kind. Since the byte positions BP511 to BP2047 are reserved areas in the conventional read-only disc, conventional devices are designed to ignore these areas, so that these areas are not obstacles when a recorded disc is played back in the conventional devices.

The identification information (disc identifier) 262 is stored in the byte position BP511, and the byte positions BP32 to BP510 are reserved areas. As the identification information (disc identifier) 262, higher 4 bits store a disc indicator, and lower 4 bits store the major digit of the revision number. Regarding the disc indicator, 0100b is allocated to the DVD-R disc as the CSS managed recording disc which is one embodiment of the present embodiment, and the rest are reserved. As the major digit of the revision number, data on the major digit of the revision number recorded in the land pre-pit (LPP) is copied, and 0001b is allocated to revision 1.x, and the rest are reserved. Since the major digit of the revision number is the binary sign of the digit x of the revision number x, y, the major digit of the revision number can be instantaneously identified, and the compatible device can still perform recording even if the major digit is changed, and moreover, incompatible devices can be clearly judged to be incompatible. For example, when the physical format is changed and the revision number is changed to 2.0, the disc indicator is changed to 0010b. This enables fast and easy disc identification in the recording device or reproducing device, and makes it possible to ensure the simplification and stabilization of the recording/reproducing processing.

As the information contents 263 which can be peculiarly set to each value of the disc identifier 262, there are recorded, in the byte positions BP512 to BP579, information on the name of the disc manufacturer, additional information from the disc manufacturer, information on the polarity (identification of whether "High-to-Low" or "Low-to-High") of the recording mark, information on a linear velocity in recording or reproduction, the rim intensity value of an optical system along the circumferential direction, the rim intensity value of an optical system along the radial direction, and recommended laser power (the value of a light amount on a recording surface) in reproduction, in positions before (write strategy) information 264 on various recording conditions in recording on the information storage medium using the recording light at 405 nm.

The information (mark polarity descriptor) on the polarity (identification of whether "High-to-Low" or "Low-to-High") of the recording mark is provided in the byte position BP575. In the conventional rewritable or recordable DVD disc, a "High-to-Low" recording film alone has been permitted in which the amount of light reflection in the recording mark decreases (low) in an unrecorded state (relatively high reflection level: high). In the meantime, when the medium receives demands such as "compatibility to high-speed recording" or "lower price", or "decrease of cross erasure" or "increase of the upper limit value of the number of rewriting" as physical performance, there will caused a problem of not being able to meet these demands simply with the "High-to-Low" recording film. On the contrary, the present embodiment permits the use of not only the "High-to-Low" recording film but also a "Low-to-High" recording film which increases the amount of light reflection in the recording mark, thereby providing an advantage that not only the conventional "High-to-Low" recording film but also the "Low-to-High" recording film is incorporated in the standard and that the selection range of the recording film can be expanded to enable the supply of media that are capable of high-speed recording or low priced.

The information on the rim intensity value of the optical system along the circumferential direction and the information on the rim intensity value of the optical system along the radial direction are arranged in the byte positions BP577, BP578. Such information means condition information of the optical system of an optical head used in determining recording conditions subsequently disposed. The rim intensity means the distribution state of the incident light entering the objective lens before focused on the recording surface of the information storage medium, and defined by "an intensity value at the position around the objective lens (position on the circumference of a pupil surface) when the central intensity of incident light intensity distribution is "1". The distribution of the intensity of the incident light entering the objective lens is not symmetric with respect to a point but is elliptic, and two values are recorded because the rim intensity value varies depending on the radial or circumferential direction of the information storage medium. The size of the focus spot on the recording surface of the information storage medium is smaller at a higher rim intensity value, so that the optimum recording power condition greatly varies depending on the rim intensity value. As the information recording/reproducing device knows in advance the information on the rim intensity value of its own optical head, the information recording/reproducing device first reads the rim intensity values of the optical systems along the circumferential and radial directions recorded in the information storage medium, and then compares these values with the value of its own optical head. The recording condition recorded subsequently can be applied if there is not a great difference as a result of the comparison, but if there is a great difference as a result of the comparison, it is necessary to ignore the recording conditions subsequently recorded and start determining the optimum recording conditions while performing test writing by the recording/reproducing device itself using the drive test zone DRTZ not shown in FIG. 12A.

Thus, it is necessary to promptly determine whether to use the recording conditions subsequently recorded or ignore this information and start determining the optimum recording conditions while performing test writing by the device itself. The condition information for the optical system whose conditions have been determined is located before the position where the recommended recording conditions are recorded as shown in FIG. 13, thus providing an advantage that it is possible to first read its rim intensity information and then rapidly determine the adaptability of the recording conditions subsequently located.

Regarding the information contents 263 which can be peculiarly set to each value of the disc identifier 262, there are recorded, as the recording condition (write strategy) information 264, peak power, bias power 1, bias power 2, bias power 3, etc., in the byte positions BP601 to BP608.

On the other hand, it has hitherto been the case that the standard document (version book) whose version is changed when the contents of the standard are greatly changed is separated from a revision book issued by changing the revision in accordance with a small change of, for example, the recording velocity, in order to be able to only issue the revision book in which the revision alone is updated every time the recording velocity is improved. Conventionally, the value indicating the recordable or rewritable disc and its version number are recorded in the byte position BP0, and the revision number of the relevant revision book is recorded in the byte positions BP17 to BP28 as described above. Thus, the reproducing and recording devices have been able to handle the different version books and revision books without confusion.

However, in the present disc, which is a recordable or rewritable/re-recordable type, a value indicating a DVD-ROM which is a read-only disc is recorded in the byte position BP0. The contents up to the byte position BP31 are the same as those of the read-only disc. Therefore, a new disc identification information has to be provided in places after the byte position BP32 which are reserved in the DVD-ROM. It is also necessary to record physical parameters (the value of a write strategy) required in recording and various kinds of information peculiar to this disc. Thus, in the previously described embodiment, the disc identifier 262 and the information contents 263 are recorded after the byte position BP511. However, the areas after the byte position BP32 should desirably be secured as reserved areas for possible future other uses because these areas are inherent areas defined for book types and their part versions. Therefore, simply using the reserved areas for new uses should be avoided because these areas would not be available for other uses. Thus, four-bit information is defined as an identifier (disc indicator) to indicate that the disc is a recording disc. An 8-bit revision number is defined as information to indicate the version of the recording standard of the disc. When used, the revision number is separated into a major digit (higher 4 bits) and a minor digit (lower 4 bits). The higher 4 bits are changed when a change that eliminates compatibility is made. The lower 4 bits are changed when compatibility is maintained but a new function is added.

Then, a total of 1 byte including 4 bits of the identifier (disc indicator) and higher 4 bits of the revision number is recorded as the identification information (disc identifier) 262 in, for example, the byte position BP511, and the byte positions BP512 to BP2047 are defined for the respective values of this information. In this manner, the information contents 263 in the byte positions BP511 to BP2048 can be newly defined when the identifier (disc indicator) or the major digit of the revision number is changed.

Any definition may be given to the area 263 peculiar to each value of the identification information (disc identifier) 262, and one example to be recorded therein is a copy of information recorded in the land pre-pit or the write strategy information. The information in the land pre-pit has a characteristic of being generally more difficult to read than information in the control data zone, having decreased signal quality after recording, and being only readable by an optical head for recording. Therefore, if the copy of the information in the land pre-pit is recorded here, it is possible to stably read the identification information on the disc manufacturer recorded in the land pre-pit and a disc type number provided by the disc manufacturer. This enables, for example, easier determination of a cause when a quality problem occurs.

As the value of this disc identifier 262 is zero in the DVD-ROM, the byte positions BP512 to BP2047 can be used when there is a need for areas for future unknown uses. When a new specification of an unrecorded disc is created, this can be handled by changing the major digit of the revision number composed of the lower 4 bits of the disc identifier 262.

When the byte positions BP512 to BP2047 need to be used for a totally different use, this can be handled by changing the disc indicator composed of the higher 4 bits of the disc identifier 262.

There is also an advantage of facilitating the identification by the recording/reproducing device and reduced occurrence of erroneous judgments because the disc indicator and the major digit of the revision number are located in the same byte position.

The minor digit composed of the lower 4 bits of the revision number can be recorded in the byte positions BP512 to BP2047. The reason is that the lower 4 bits are digits that are changed when the existing definition needs no change and therefore do not have to be contained in the identification information (disc identifier) 262, and these are values independently set for each major digit of the revision number of the identification information (disc identifier) 262 and are thus not have to be set outside the area 263. This enables identification by changing the minor digit of the revision number in the case of a small change which includes no change of the existing definition and no elimination of compatibility, for example, in the case where a new function is added without changing the conventional functions.

The distinction between EST and MOD does not have to be made with the identification information (disc identifier) 262 if the physical characteristics of an unrecorded disc are the same, and information that enables differentiation can be provided in the area 263 when necessary.

Figure 16:
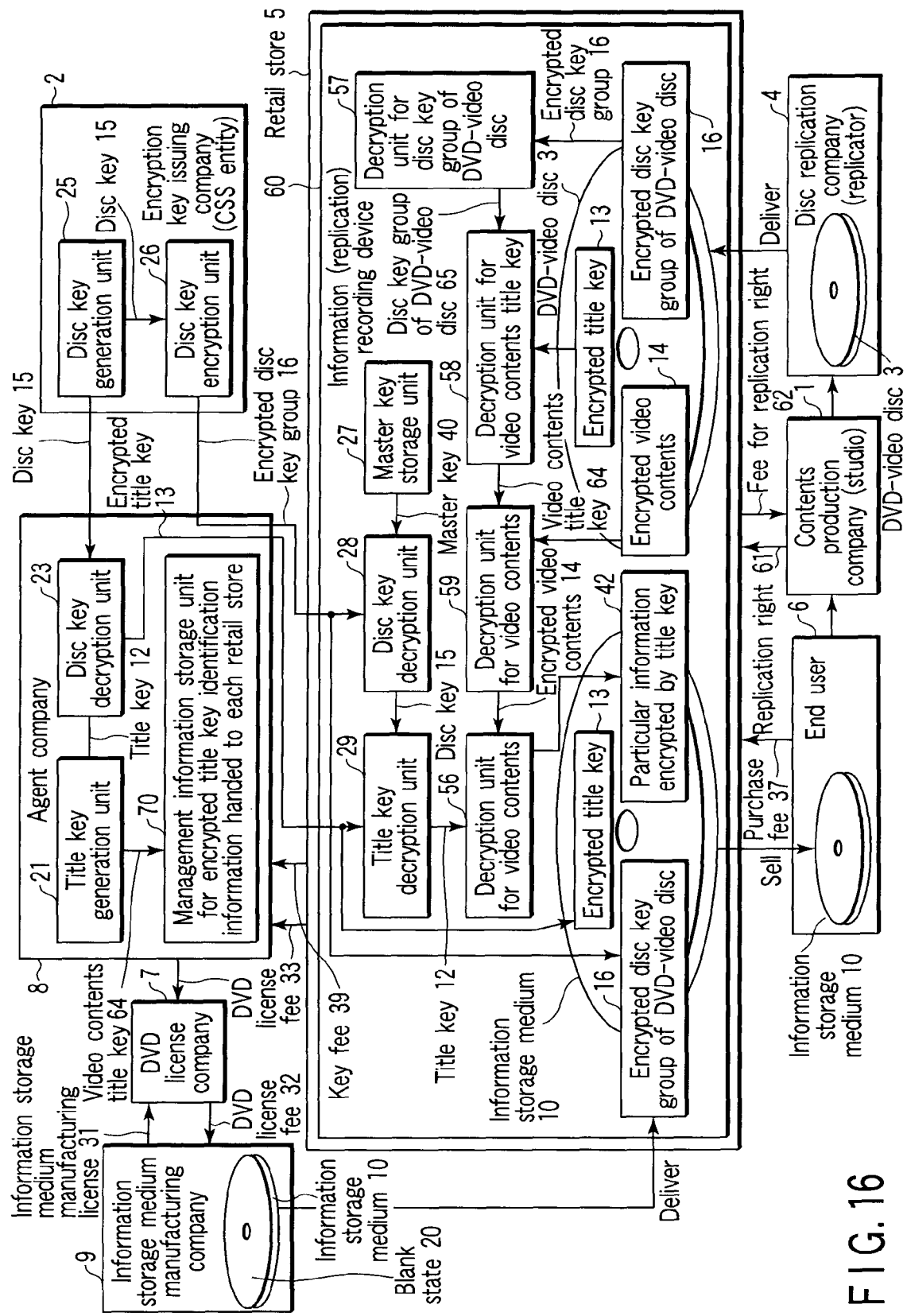
FIG. 16 is an exemplary schematic diagram explaining one example of a video information distribution system realized by using the information storage medium of the present embodiment.

As shown in FIG. 15 or 16, the blank information storage medium 10 is sold from the information storage medium manufacturing company 9.

In the present embodiment, in the case of use by MOD, the blank information storage medium 10 is sold to the retail store 5 from the information storage medium manufacturing company 9 so that the information in the lead-in area LDI shown in FIG. 12A (including the physical format information PFI in the control data zone CDZ) is not recorded in the medium.

In this method, the information storage medium manufacturing company 9 bears no cost for recording the information in the lead-in area LDI (including the physical format information PFI in the control data zone CDZ) in the information storage medium 10, and can therefore sell the information storage medium 10 in a blank state 20 to the retail store 5 at low cost.

In the case of MOD, the recording conditions (write strategy) for recording with the recording light at 405 nm are recorded in advance in the land pre-pit 108.

In the case of MOD, the information recording (copying) device 55 having good performance in reproducing the information previously recorded in the land pre-pit 108 is used, which ensures stability in reproducing the information from the land pre-pit 108. In contrast, when the medium is used in accordance with EST, the lead-in area is recorded in the information storage medium manufacturing company 9, so that the recording device owned by the end user 6 can not ensure the stability in reproducing the information from the land pre-pit 108 present in the lead-in area LDI.

Therefore, in the present embodiment, the information storage medium 10 in the blank state 20 is sold after recording therein the information in the control data zone CDZ (and the lead-in area LDI including this zone) including the physical format information PFI in which the recording conditions (write strategy) for recording with the recording light at 405 nm are written.

Since the reliability is high in the reproduction of the information (the recording mark 105) recorded with the recording light at 405 nm, reliability in obtaining the recording conditions (write strategy) information when the medium is used in accordance with EST is significantly improved according to the present embodiment.

Alternatively, when key information needs to be recorded for new copy protection in the DVD-ROM, the key information can be recorded in the area 264 if completely undefined value is used as PGD.

As shown in FIG. 13, the recording conditions (write strategy) for recording with the recording light at 405 nm can be recorded after the byte position BP601 in the area of the information contents 264 which can be peculiarly set to each value of the identification information.

In the current recordable DVD-R disc, the recording conditions (write strategy) for recording with the light at a wavelength of 650 nm can be recorded in this area, such that the recording conditions (write strategy) varying depending on the kind of the information storage medium can be recorded in the same area, and the area in the physical format information PFI can be effectively used.

The contents of information recorded in a current DVD-video disc and the place to create this information are described with FIG. 14.

The current DVD-video disc is encrypted using a content scramble system (CSS) method as a function to prevent illegal copying of image information.

The video contents 11 created by a contents production company (studio) 1 are distributed to a disc copying company (replicator) 4 using a tape as a medium or by network transfer.

When the illegal copying of the video contents 11 is to be prevented, the distributed video contents 11 as such are not recorded in a DVD-video disc 3, encrypted video contents 14 in which the video contents 11 are encrypted by a title key 12 are recorded in the DVD-video disc 3.

This encryption processing is performed in an video contents encryption unit 22 in the disc copying company (replicator) 4, and the title key 12 used for the encryption is also issued in a title key generation unit 21 the disc copying company (replicator) 4.

The disc copying company (replicator) 4 receives disc key information 15 and encrypted information on a disc key group 16 from a CSS entity 2 which is an encryption key issuing company with a charge (by paying key fee 17), and records the encrypted information on the disc key group 16 in the DVD-video disc 3.

Furthermore, the title key 12 is encrypted using information on the disc key 15 received from the CSS entity 2, and an encrypted title key 13 is also recorded in the DVD-video disc 3.

In the current DVD-video disc, the encrypted disc key group 16 is recorded in the lead-in area (in the control data zone CDZ shown in FIG. 12A in the lead-in area LDI in FIG. 11), and information on the encrypted title key 13 is arranged in a dispersed manner and recorded in a particular place in a physical sector which is the basic recording unit of the DVD-video disc 3.

The disc copying company (replicator) 4 pays a DVD license fee 19 to a DVD license company 7 for every production of the DVD-video disc 3, and obtains a DVD-video disc manufacturing license 18.

Thus, the end user 6 pays purchase fee 35 to purchase the DVD-video disc 3 in which the encrypted disc key group 16, the encrypted title key 13 and the encrypted video contents 14 are recorded.

Although not shown in the DVD player which is the reproducing device owned by the end user 6, the disc key is decrypted using a master key, and the title key 12 generated (decrypted) using the decrypted disc key is used to restore the encrypted video contents 14 to the unencrypted video contents 11, and then the video contents 11 are reproduced and displayed.

In the current DVD-video disc 3, the encrypted disc key group 16, the encrypted title key 13 and the encrypted video contents 14 are recorded as pits having micro uneven shapes. On the contrary, the present embodiment is greatly characterized in that they are recorded in the information storage medium 10 in the form of the recording marks 105 formed by the recording light at a wavelength of λw and in that the encrypted particular information 45 (the encrypted video contents 14) regarding the video contents 11, and encryption-related information regarding the CSS method are distributed on a network.

While the DVD-R disc which is the current recordable information storage medium uses content protection for recordable media (CPRM) as an encryption scheme for prevention of illegal copying, the information storage medium 10 shown in the present embodiment is greatly characterized as an information storage medium in that information regarding the CSS shown in FIG. 14 is recorded therein.

That is, although the recording marks 105 are formed instead of the pits having the uneven shapes in the information storage medium according to the present embodiment after information has been recorded therein by the recording light at a wavelength of λw, this disc can be recognized and played back by the DVD player (reproducing device) as if it were a DVD-video disc created in accordance with FIG. 14.

Therefore, in the information storage medium according to the present embodiment after information has been recorded therein by the recording light at a wavelength of λw, the encrypted disc key group 16 regarding the CSS (recorded in the control data zone CDZ in the lead-in area LDI shown in FIG. 12A), the encrypted title key 13 and the encrypted video contents 14 are recorded.

The present embodiment is also characterized in that the disc is clearly specified as a "read-only medium (DVD-ROM disc)" in the physical format information PFI in the control data zone CDZ shown in FIG. 12B so that this disc is recognized by the existing DVD player (reproducing device) as if it were a DVD-video disc.

This enables the stable reproduction of the information recorded in the information storage medium 10 shown in the embodiment of the present invention without imposing any burden on the DVD player (reproducing device).

Specifically, in the present embodiment, a standard document type is set to "0000b" in "standard document type information and version number information" recorded in the byte position BP0 in FIG. 13 to specify the standard document type as a DVD-ROM standard document.

Even if the standard document type is specified as described above, it is possible to know whether the information storage medium of the present embodiment is a true DVD-ROM disc if the disc identifier 262 in the byte position BP511 shown in FIG. 13 is used.

Furthermore, while the presence of the emboss pit and a write-once or rewrite area is specified in a medium structure recorded in the byte position BP2 in FIG. 13, the present embodiment sets the values of "b2, b1, b0" to "001" in order to clearly indicate to the DVD player (reproducing device) as if this structure has the emboss pit alone.

In information on the medium structure, b2=0b indicates that the corresponding information storage medium has no rewritable/re-recordable user area therein, and b2=1b indicates that the corresponding information storage medium has a rewritable/re-recordable user area therein.

b1=0b indicates that the corresponding information storage medium has no recordable user area therein, and b1=1b indicates that the corresponding information storage medium has a recordable user area therein.

b0=0b indicates that the corresponding information storage medium has no user area therein in which the emboss pit is formed, and b0=1b indicates that the corresponding information storage medium has a user area therein in which the emboss pit is formed.

In the information storage medium 10 used in the above-mentioned MOD method, the encrypted disc key group 16, the encrypted title key 13 and the encrypted video contents 14 are recorded by the information recording (copying) device 55 installed in the retail store 5 as shown in FIG. 15 or 16. In the information storage medium used in the above-mentioned EST method, the encrypted disc key group 16 is recorded by the information storage medium manufacturing company 9, and the encrypted title key 13 and the encrypted video contents 14 are recorded by the recording device owned by the end user 6.

In any way, in the present embodiment, CSS-related information and information associated with the particular information on, for example, the video contents 14 are distributed to the recording device via a network.

During such distribution on the network, there is an increased risk that the particular information such as the video contents 14 are illegally copied, or various kinds of key information regarding the CSS are stolen, such that the encrypted particular information 42 (the encrypted video contents 14) recorded in the information storage medium 10 are illegally decrypted and illegally copied.

In order to solve this problem, in the present embodiment, the particular information such as the video contents 14 and the various kinds of key information regarding the CSS are encrypted and the encrypted data is distributed via the network.

This provides an advantage that even if the information has leaked via the network, the leaked information is not unencrypted (plain) information but is always encrypted information and thus can not be reproduced, thereby preventing illegal copying.

The characteristics of the present embodiment are described in detail with FIG. 15.

As described above, the information storage medium 10 used in the MOD method is recorded by the light with a recording wavelength λw (≠650 nm) in the information recording (copying) device 55 installed in the retail store 5.

A communication key storage unit 52 and a master key storage unit 27 are in this information recording (copying) device 55.

The communication key storage unit 52 and the master key storage unit 27 are illustrated differently from each other in FIG. 15, but the present invention is not limited to the above, and one memory is commonly used as these units.

The retail store 5 pays communication key fee 49 to the production company (contents provider) 54 of the particular information such as the video contents 11, and thus purchases a communication key 44.

The particular information production company (contents provider) 54 uses this communication key 44 to encrypt the particular information 45 such as the video contents 11, and distributes the particular information 45 encrypted by the communication key 44 to the retail store 5 via the network.

When the retail store 5 sells the information storage medium 10 in which the particular information 45 is recorded in an encrypted manner to the end user 6, the retail store 5 pays copy permission fee 47 corresponding to the sale to the particular information production company (contents provider) 54.

The particular information 45 encrypted by the communication key distributed from the particular information production company (contents provider) 54 is once decrypted in a decryption unit 51 for the particular information using the already distributed information on the communication key 44.

Immediately after this, the particular information 45 is decrypted by the title key 12, and recorded in the information storage medium 10 in the form of the particular information 42 encrypted by the title key 12.

The disc key 15 is transferred between the encryption key issuing company (CSS entity) 2 and the disc copying company (replicator) 4 in the example of the current case in FIG. 14, and the transfer through this path is carried out under an environment in which sufficient security measures are taken. In contrast, sufficient security measures are not taken in the network path on the system shown in FIG. 15, and there is a risk that the disc key 15 may leak out along this path.

Therefore, in the embodiment shown in FIG. 15, the encrypted title key 13 is transferred to the retail store 5 via the network instead of the plain (unencrypted) disc key 15.

In order to enable this, the agent company 8 is disposed between the encryption key issuing company (CSS entity) 2 and the retail store 5 in the present embodiment.

In the agent company 8, the title key 12 for each title is issued by the title key generation unit 21.

Then, the encrypted title key 13 is generated in a title key encryption unit 23 using the disc key 15 transferred from the encryption key issuing company (CSS entity) 2 under an environment in which sufficient security measures are taken, and the encrypted title key 13 is thus distributed to the retail store 5 on the network.

In the information recording (copying) device 55 in the retail store 5, the encrypted title key 13 distributed on the network is recorded as it is in the information storage medium 10.

The retail store 5 pays key fee 39 and a DVD license fee 33 to the agent company 8 in accordance with the number of recording of the title key 13 recorded in the information storage media 10.

The agent company 8 combines the DVD license fees 33 thus collected and pays them to the DVD license company 7.

The DVD license company 7 provides an information storage medium manufacturing license 31 to the information storage medium manufacturing company 9 instead of collecting a DVD license fee 32 from the information storage medium manufacturing company 9 which manufactures the information storage medium 10 in the blank state 20.

While the agent company 8 shown in FIG. 15 receives the encrypted disc key group 16 together with the disc key 15 from the encryption key issuing company (CSS entity) 2 in the same manner as the disc copying company (replicator) 4 shown in FIG. 14, the agent company 8 distributes the encrypted disc key group 16 as it is to the retail store 5 on the network.

All the information thus distributed to the retail store 5 on the network is encrypted information such as "the particular information 45 encrypted by the communication key 44", "the encrypted disc key group 16" and "the encrypted title key 13". Thus, even if the information leaks along the network path, illegal copying can be prevented.

Although FIG. 15 explains the information storage medium 10 used in the MOD method, the present embodiment is not limited to this and can also be applied to the information storage medium 10 used in the EST method.

While the destination of the distribution via the network is the end user 6 in the case of EST, all the information communicated in this case is also encrypted information such as "the particular information 45 encrypted by the communication key 44", "the encrypted disc key group 16" and "the encrypted title key 13", so that illegal copying can be prevented.

Furthermore, in both MOS and EST, the CSS-related information distributed on the network corresponds to the information recorded in the information storage medium 10 such as "the encrypted disc key group 16" and "the encrypted title key 13", so that processing before a recording stage in the information recording (copying) device 55 is simplified to a great extent, achieving a decreased price and improved processing reliability of the information recording (copying) device 55.

In a decryption unit 28 of the disc key in the information recording (copying) device 55, a master key 40 transferred from the master key storage unit 27 is used to decrypt the encrypted disc key group 16 distributed from the agent company 8 on the network.

In a decryption unit 29 of the title key, the disc key 15 obtained here is used to decrypt the encrypted title key 13 distributed likewise from the agent company 8 on the network to generate the title key 12, and this title key 12 is used to encrypt particular information 43 in an encryption unit 41 for the particular information, and then the encrypted particular information 43 is recorded in the information storage medium 10.

An alternative embodiment (application) of the present embodiment is shown in FIG. 16.

The embodiment in FIG. 16 conforms to the embodiment in FIG. 15 in that the CSS-related information distributed to an information recording (copying) device 60 on the network is encrypted information recorded in the information storage medium 10 including "the encrypted disc key group 16" and "the encrypted title key 13".

However, the application in FIG. 16 is different from the embodiment in FIG. 15 in that the ordinary DVD-video disc 3 is delivered instead of distributing the video contents 11 on the network.

In the embodiment shown in FIG. 16, in the information recording (copying) device 60, the encrypted video contents 14 recorded in the DVD-video disc 3 is decrypted (decoded), and the video contents 14A after decrypted are again encrypted and recorded in the information storage medium 10 of the present embodiment.

As described above, according to the information storage medium of the embodiment, a wavelength to be used is changed between recording light and reproducing light for a recording mark, and pre-groove shape and dimensions and land pre-pit shape and dimensions are set so that an off-track detection signal and a land pre-pit detection signal are obtained for the recording light and at the same time, the reproducing light is hardly affected by a pre-groove and a pre-pit, thereby achieving further stabilization in recording processing and reproducing processing.

Furthermore, according to the information storage medium of the embodiment which comprises a lead-in area, and a data area disposed in an outer peripheral side of the lead-in area, the lead-in area includes a control data zone, the control data zone stores physical format information, the physical format information includes: first information common irrespective of book type; second information peculiar to the book type; and third information peculiar to each kind of second information, the first information includes byte information indicating the book type and a version number, and the second information includes byte information indicating a disc indicator and the major digit of a revision number.

Even if the book type of the first information indicates a read-only disc, the disc indicator of the second information indicates a recordable disc, such that even a recordable disc can be recognized as a read-only disc by a player. A recording device can recognize the disc to be a recordable disc in accordance with the disc indicator.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A recordable or re-recordable information storage medium which comprises a lead-in area, and a data area allocated in an outer side of the lead-in area, wherein
the lead-in area includes a control data zone,
the control data zone stores physical format information,
the physical format information includes first information common to book types; second information stored in a reserved area of a read-only information storage medium; and third information which is set depending on a kind of second information and is stored in the reserved area of the read-only information storage medium,
the first information includes one byte information indicating the book type which indicates read-only information storage medium and a version number of specifications of the book type,
the second information is a disc identifier which is one byte information comprising the major digits of a revision number of specifications of the information storage medium and a disc indicator which indicates the information storage medium is recordable or re-recordable, and
a definition of the third information depends on the disc identifier and the third information indicates a write strategy.

2. A method of recording information in a recordable or re-recordable information storage medium which comprises a lead-in area, and a data area allocated in an outer side of the lead-in area, wherein
the lead-in area includes a control data zone,
the control data zone stores physical format information,
the physical format information includes first information common to book types; second information stored in a reserved area of a read-only information storage medium; and third information which is set depending on each kind of second information and is stored in the reserved area of the read-only information storage medium, the third information including a write strategy,
the first information includes one byte information indicating the book type which indicates read-only information storage medium and a version number of specifications of the book type,
the second information is a disc identifier which is one byte information comprising the major digits of a revision number of specifications of the information storage medium and a disc indicator which indicates the information storage medium is recordable or re-recordable, and
a definition of the third information depends on the disc identifier, the method comprising:
reading the book type, the major digit of the revision number and the disc indicator;
reading the write strategy when the major digit of the revision number and the disc indicator indicate that recording is permitted for the information storage medium; and
recording data in the data area on the basis of the write strategy.

3. A method of reproducing data from a recordable or re-recordable information storage medium which comprises a lead-in area, and a data area allocated in an outer side of the lead-in area, wherein
the lead-in area includes a control data zone,
the control data zone stores physical format information,
the physical format information includes first information common to book types; second information stored in a reserved area of a read-only information storage medium; and third information which is set depending on each kind of second information and is stored in the reserved area of the read-only information storage medium,
the first information includes one byte information indicating the book type which indicates read-only information storage medium and a version number of specifications of the book type,
the second information is a disc identifier which is one byte information comprising the major digits of a revision number of specifications of the storage medium and a disc indicator which indicates the storage medium is recordable or re-recordable, and
a definition of the third information depends on the disc identifier, the method comprising:
reading the book type, the major digit of the revision number and the disc indicator; and
reading data from the information storage medium based on the disc identifier when the book type indicates read-only disc and the disc indicator indicates that reading is permitted for the information storage medium.

* * * * *